INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kurt Kelman, ... ATTORNEYS INVENTORS
PETER COLIN PAGE
RONALD FRANK ROUS
PAUL SIGRIST
PETER WILLIAM WARD
BY Kinzler, Kinzler & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kinzler, Kitchton & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS INVENTORS
PETER COLIN PAGE
RONALD FRANK ROUS
PAUL SIGRIST
PETER WILLIAM WARD
BY Kirschstein, Kirschstein & Ottinger
ATTORNEYS

United States Patent Office 3,423,539

Patented Jan. 21, 1969

3,423,539

AUTOMATIC TELEPHONE EXCHANGE SWITCHING SYSTEMS

Peter Colin Page, Coventry, Ronald Frank Rous, Kenilworth, Paul Sigrist, Coventry, and Peter William Ward, Hatch End, England, assignors to The General Electric Company Limited, London, England, a British company

Filed Nov. 5, 1965, Ser. No. 506,473
Claims priority, application Great Britain, Nov. 9, 1964, 45,540/64, 45,541/64
U.S. Cl. 179—18 42 Claims
Int. Cl. H04m *3/00*

ABSTRACT OF THE DISCLOSURE

An automatic switching system for a telephone exchange including a plurality of control equipment each of which is adapted to control and supervise the one-at-a-time setting up of connections through the system. When a fault occurs during the setting up of a connection using any particular one of the control equipment, a further attempt to set up that connection is initiated using a different one of the control equipment. A route simulating arrangement for the selection of free routes for connections through the system is also described.

Figure 1:
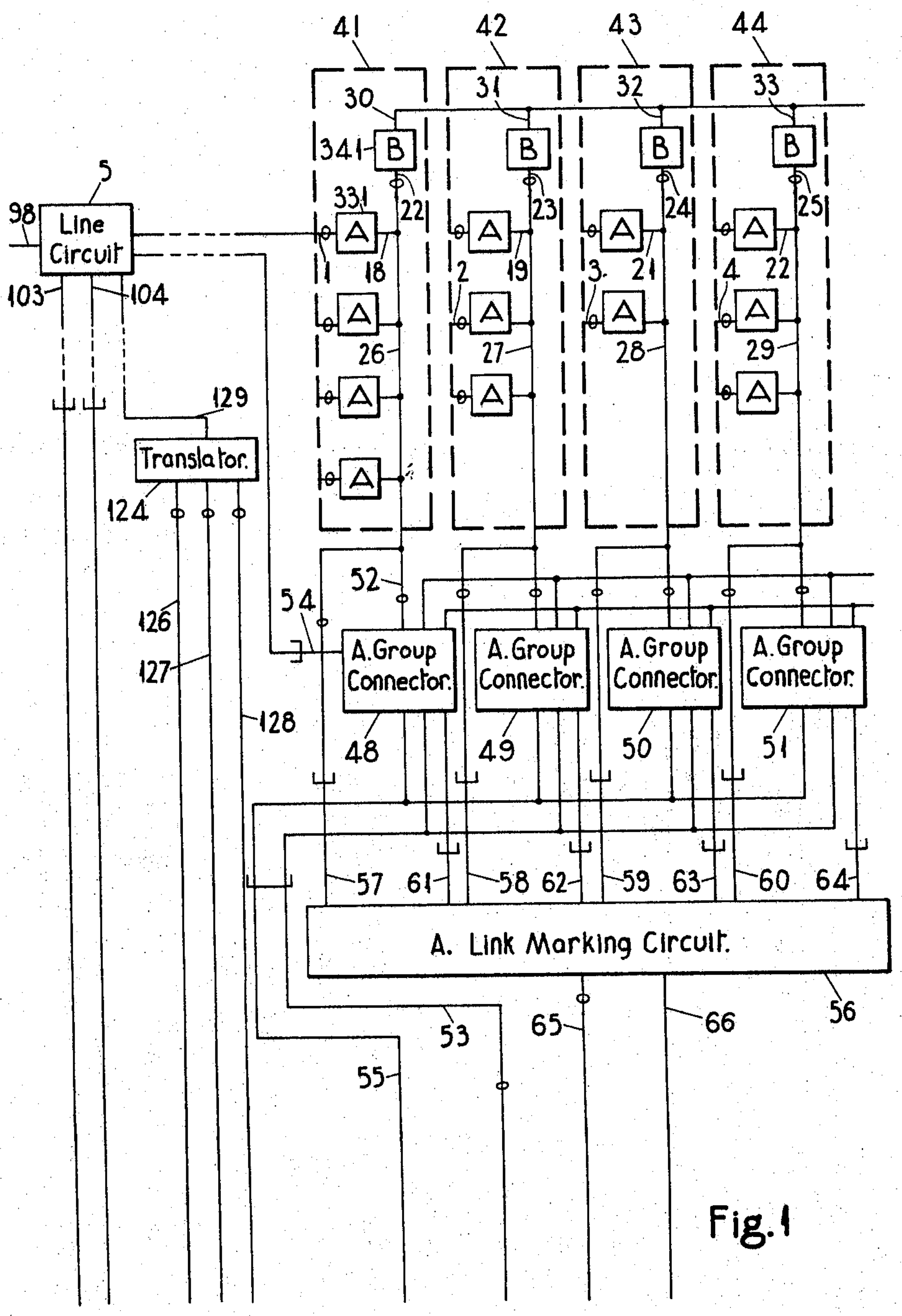
Figure 2:
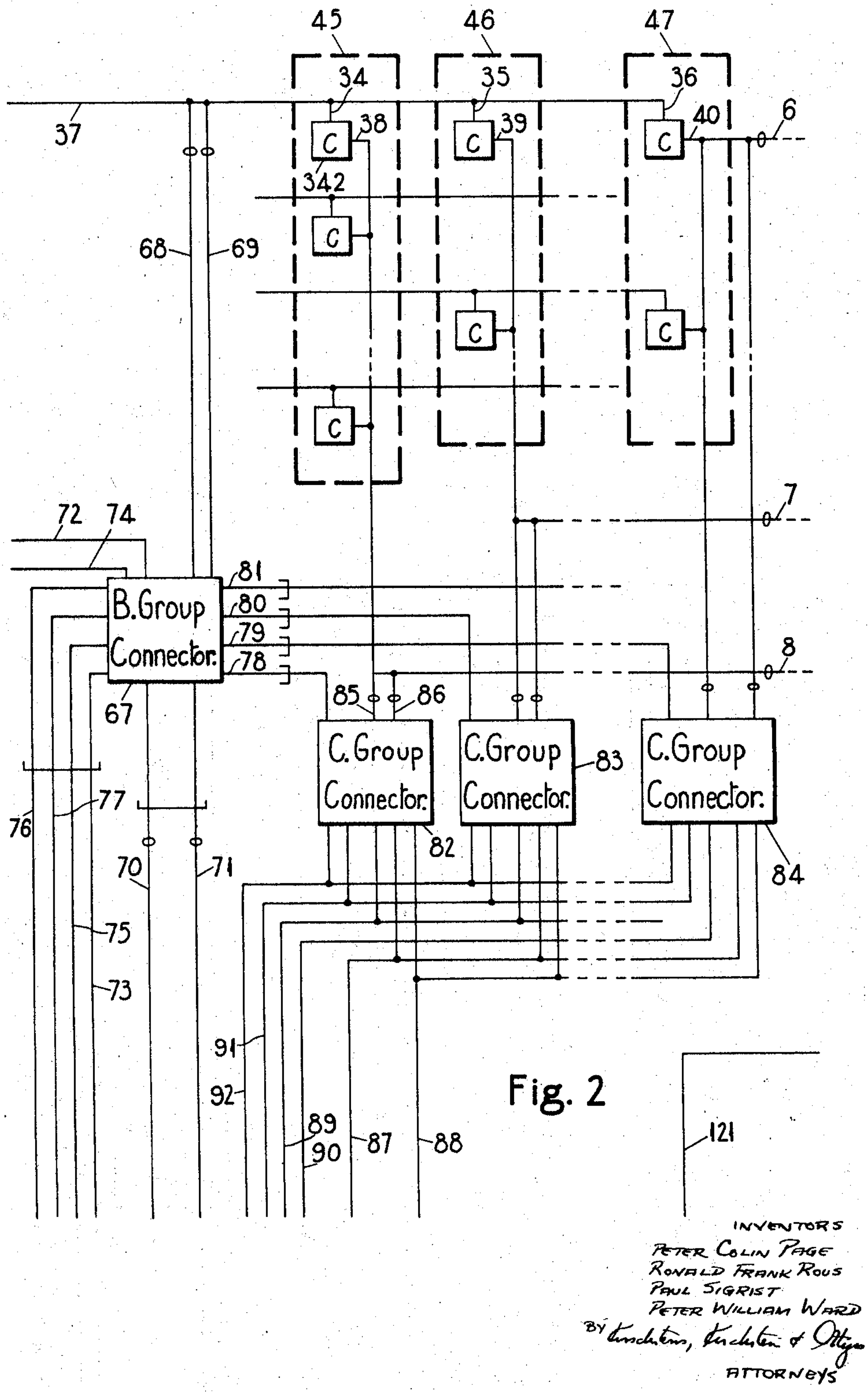
Figure 3:
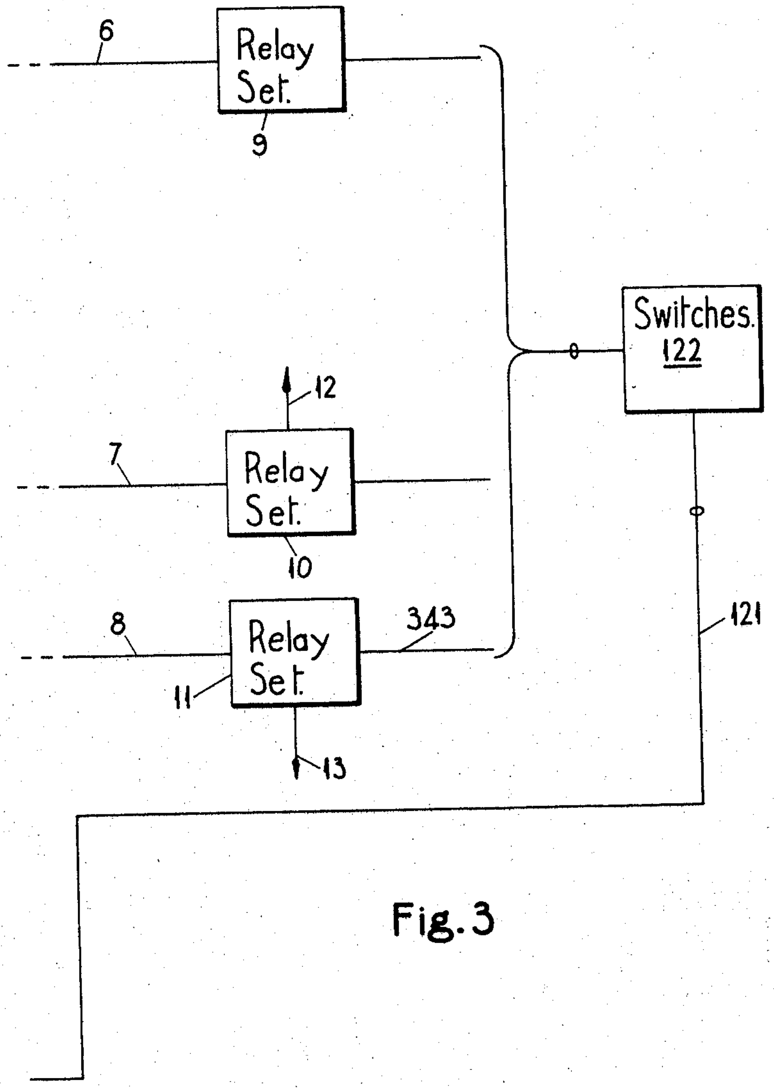
Figure 4:
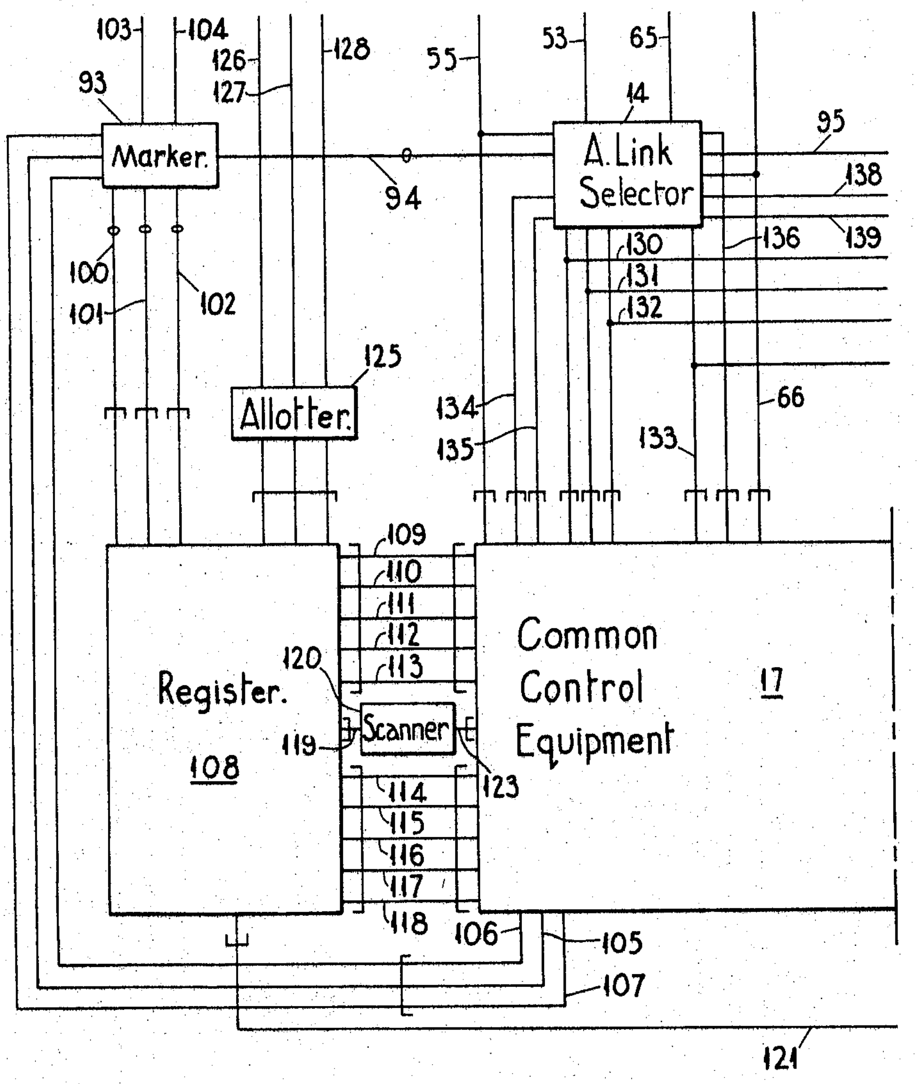
Figure 5:
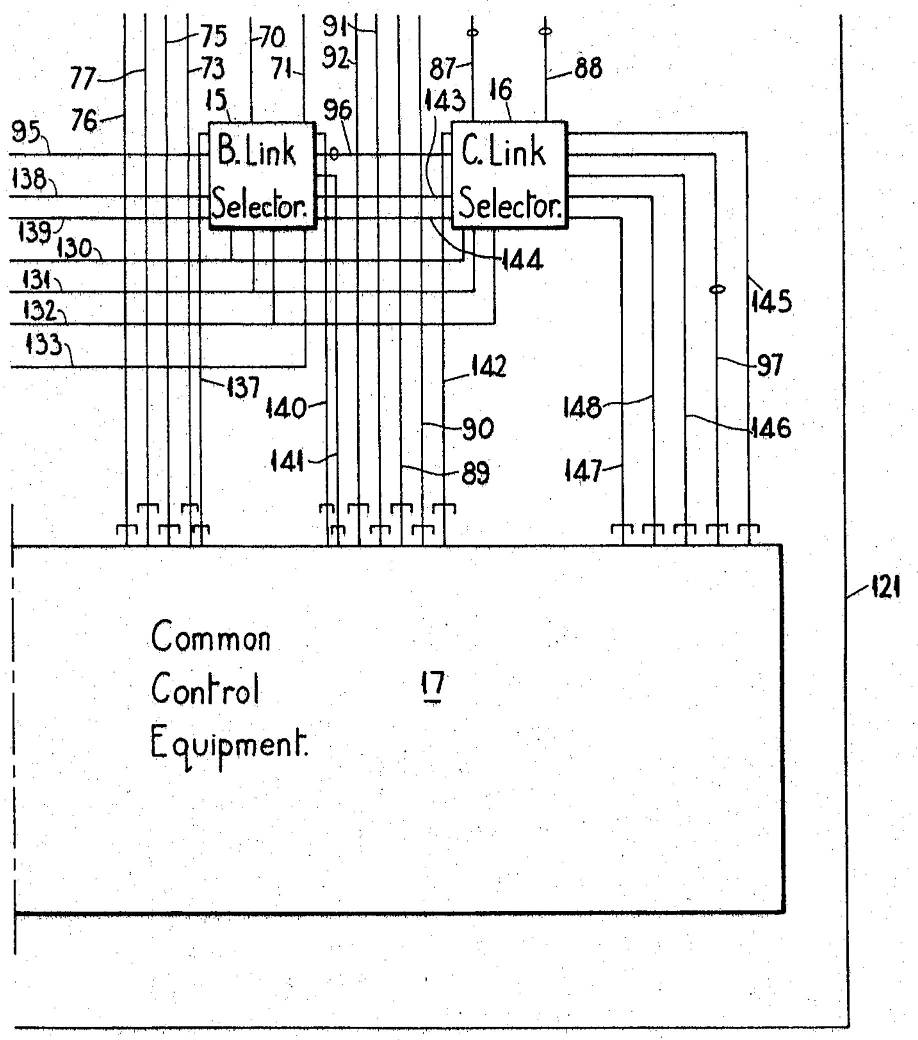

This invention relates to automatic switching systems of the kind in which connections are set up one at a time through switching stages of the system under the control and supervision of common control equipment.

A disadvantage of an automatic switching system of this kind which has only one common control equipment is that usually it is rendered completely inoperative by the occurence of a fault condition in that equipment. It has been proposed to overcome this disadvantage by providing a stand-by common control equipment which is brought into operation in the event of a fault condition occurring in the normally operative common control equipment.

This concept of providing a stand-by equipment for use in the event of failure of the normally operative equipment is not very satisfactory. Thus if a fault condition develops in the stand-by equipment while it is inoperative the advantage of providing that equipment is lost. Furthermore since the stand-by equipment is to be brought into operation in the event of a fault condition occurring in the normally operative equipment, it is necessary to distinguish between such a fault condition and a fault condition occurring elsewhere in the system and this is often difficult.

It is an object of the present invention to provide an improved automatic switching system of the kind specified above in which the aforementioned disadvantage is overcome in a more satisfactory way than by providing a stand-by common control equipment for use in the event of failure of the normally operative common control equipment.

According to the present invention, in an automatic switching system connections through switching stages of that system are set up one at a time and each under the control and supervision of any one of a plurality of common control equipments, and there are provided selecting means having a plurality of conditions in each of which a different one of said control equipments is selected for use in setting up such connections, fault indicating means arranged to operate if the then selected control equipment fails to function in a predetermined manner during the setting up of any connection, means arranged to change the condition of said selecting means in response to any operation of said faut indicating means so that another one of said control equipments is selected, and means arranged to initiate a further attempt to set up a connection when the previous attempt results in the operation of said fault indicating means, succeeding attempts to set up any particular connection each using a different one of the control equipments.

There may be provided counting means arranged periodically to change the condition of said selecting means so that in the absence of fault conditions the control equipments are used in sequence each for setting up a predetermined number of connections.

According to a feature of the present invention, in an automatic switching system connections through switching stages of that system are set up one at a time and each under the control and supervision of any one of a plurality of common control equipments and there are provided selecting means having a plurality of conditions in each of which a different one of said control equipments is selected for use, counting means arranged periodically to change the condition of said selecting means so that in the absence of fault conditions the control equipments are used in sequence each for setting up a predetermined number of connections, fault indicating means arranged to operate if the then selected control equipment fails to function in a predetermined manner during the setting up of any connection, means arranged to change the condition of said selecting means in response to any operation of said fault indicating means so that another one of said control equipments is selected, means arranged to initiate a further attempt to set up a connection when the previous attempt results in the operation of said fault indicating means, and means arranged to prevent more than a predetermined number of such attempts being made to set up any particular connection, a different one of said control equipments being used for each of succeeding attempts to set up any particular connection.

In a particular embodiment of an automatic switching system according to the present invention, connections through switching stages of that system are set up one at a time and each under the control and supervision of either one of two common control equipments, and there are provided selecting means having two conditions in each of which a different one of said control equipments is selected for use in setting up such connections, counting means arranged periodically to change the condition of said selecting means so that in the absence of fault conditions the control equipments are used alternately each for setting up a predetermined number of connections, fault indicating means arranged to operate if the then selected control equipment fails to function in a predetermined manner during the setting up of any connection means arranged to change the condition of said selecting means in response to any operation of said fault indicating means so that the other one of said control equipments is selected, means arranged to initiate a further attempt to set up a connection when the previous attempt results in the operation of said fault indicating means, and means arranged to prevent more than two attempts being made to set up any particular connection.

Preferably there is also provided fault evaluating means in which are recorded individually the malfunctions of each control equipment that result in operations of said fault indicating means and in which there is means arranged automatically to compare these records and to inhibit further operation of any control equipment which, from such comparison, is indicated to be faulty.

There may be provided means arranged to reduce by one the number of attempts which can be made to set up any particular connections each time operation of any control equipment is inhibited from said fault evaluating means.

Figure 6:
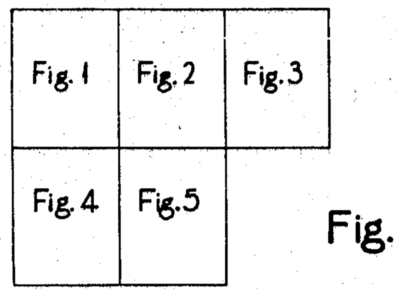
Figure 7:
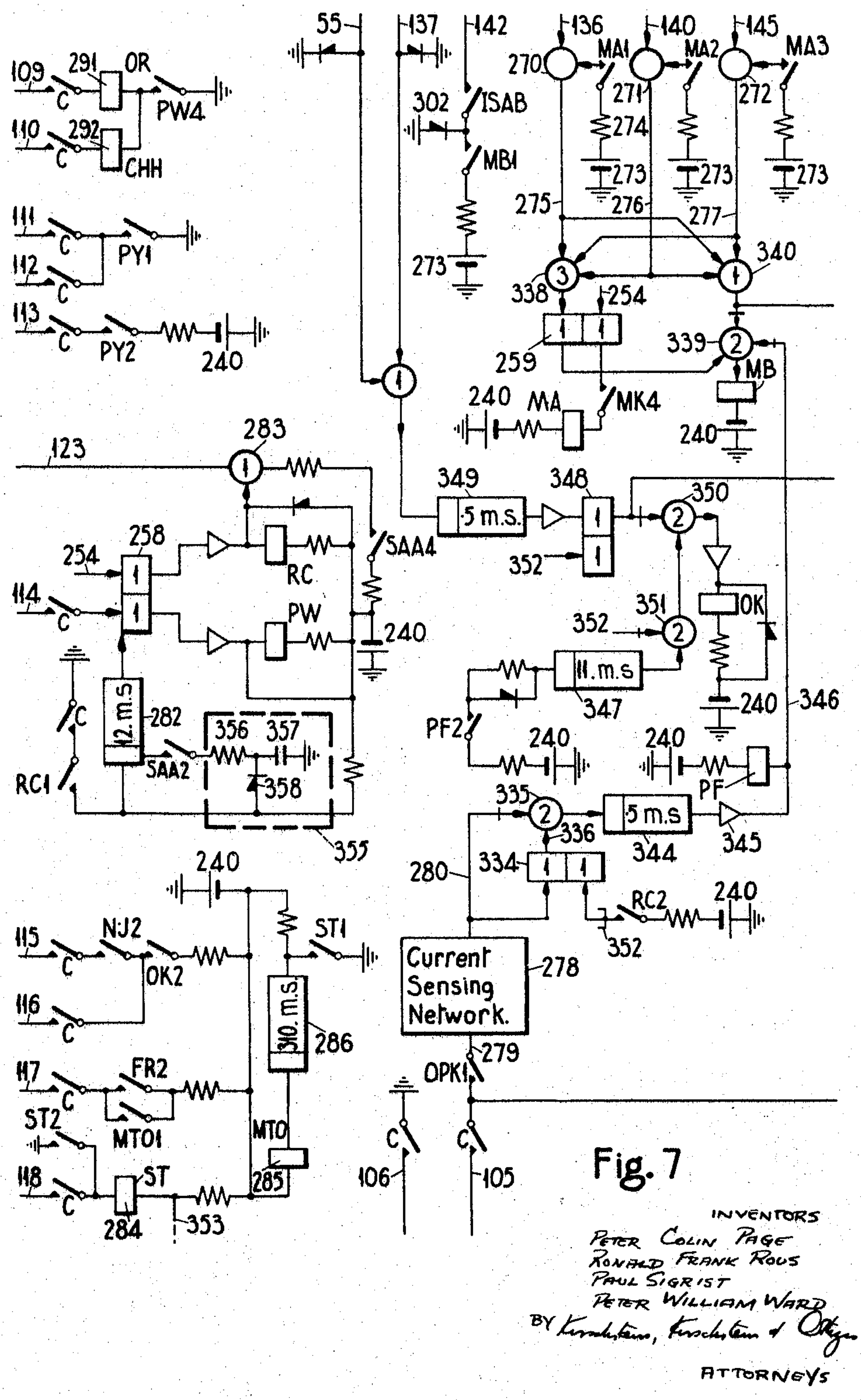
Figure 8:
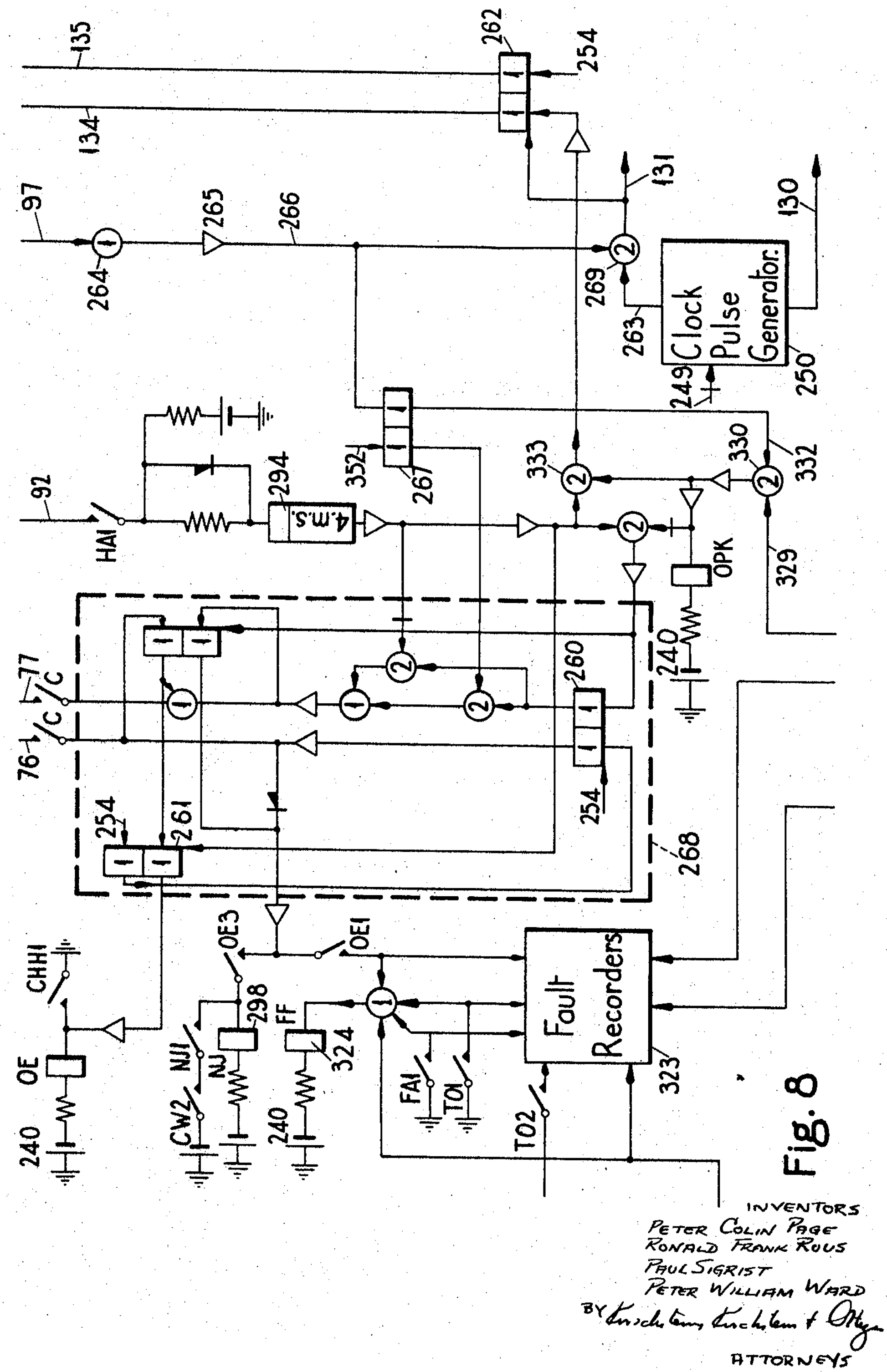
Figure 9:
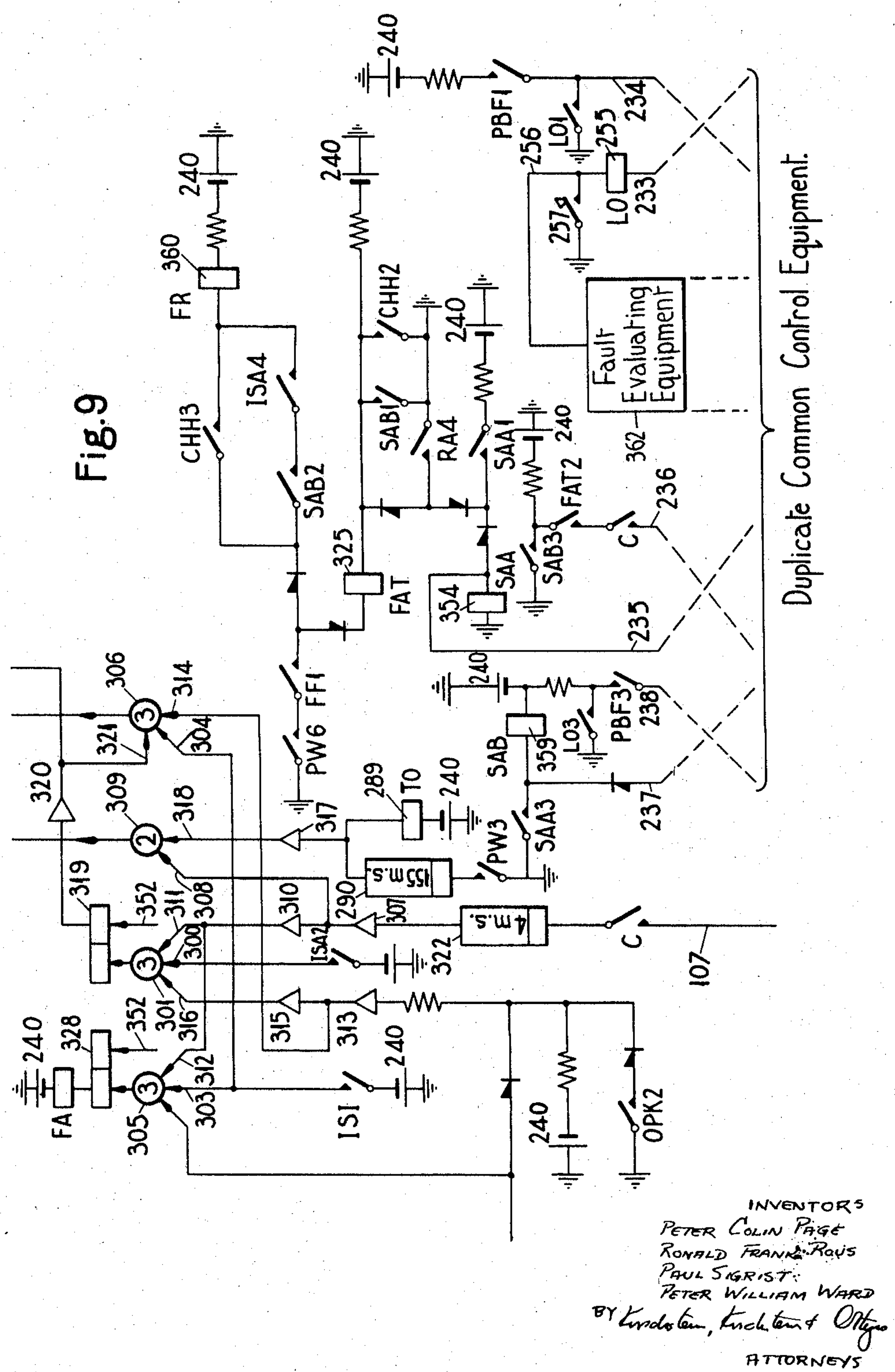
Figure 10:
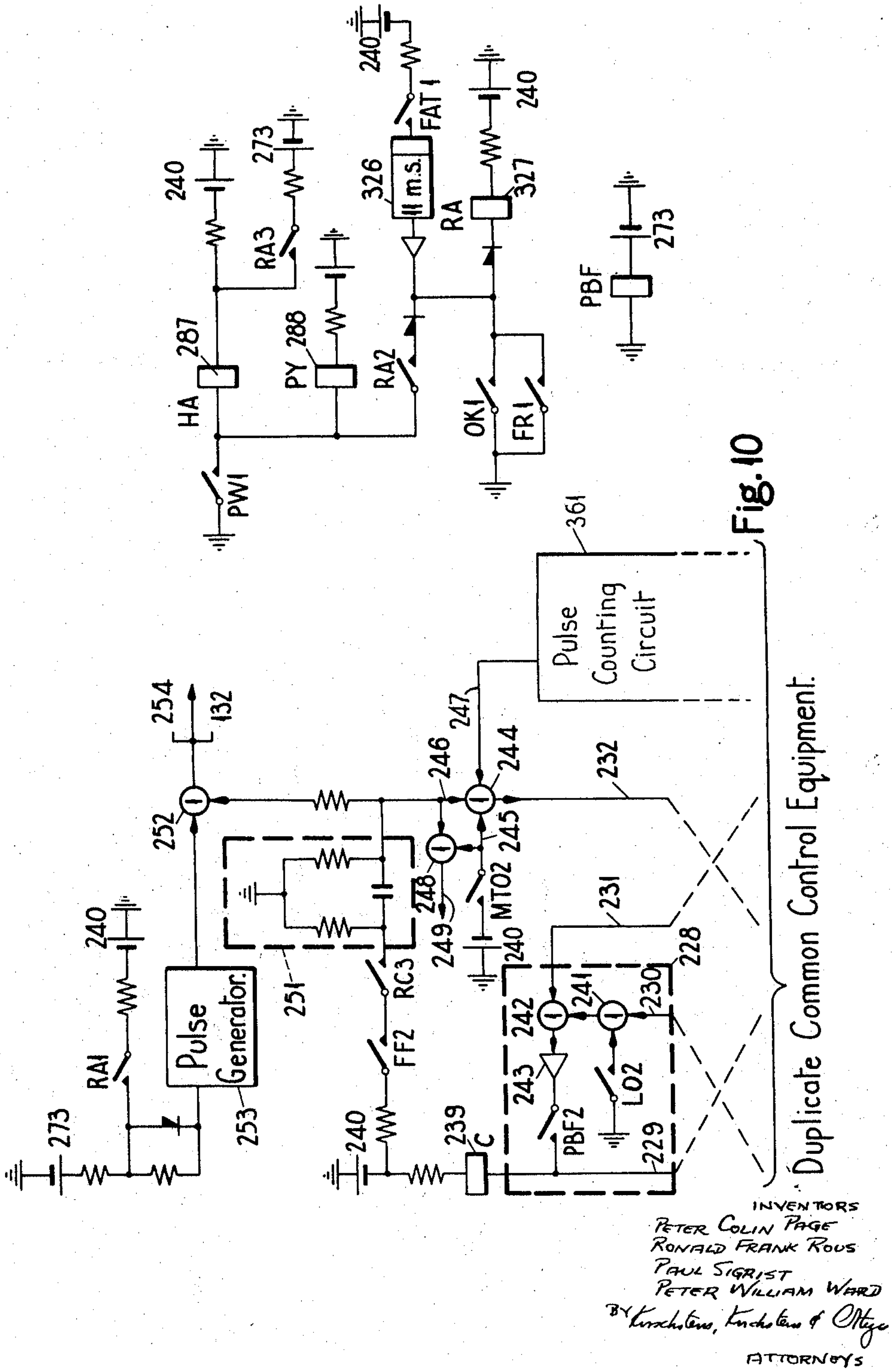
Figures 11, 12:
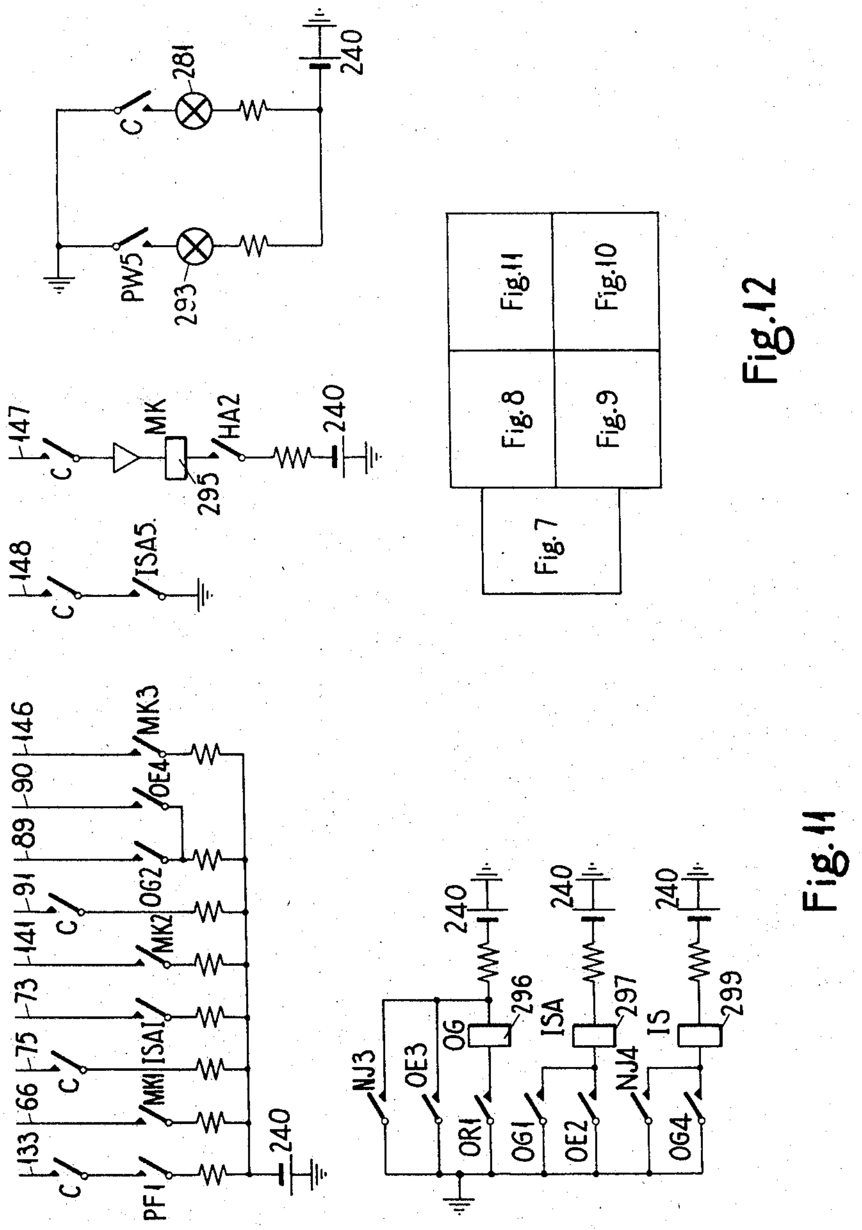
Figure 13:
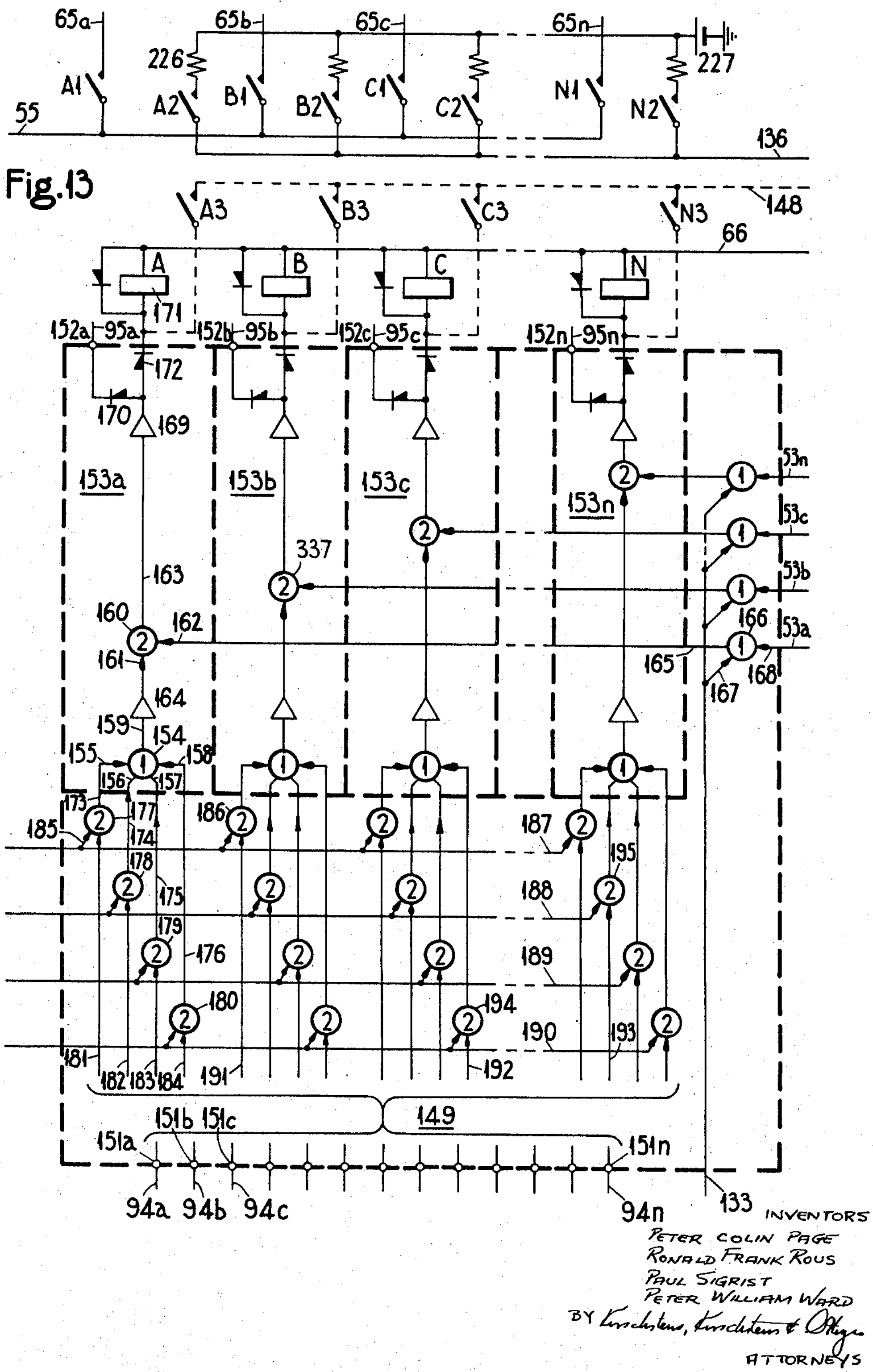
Figure 14:
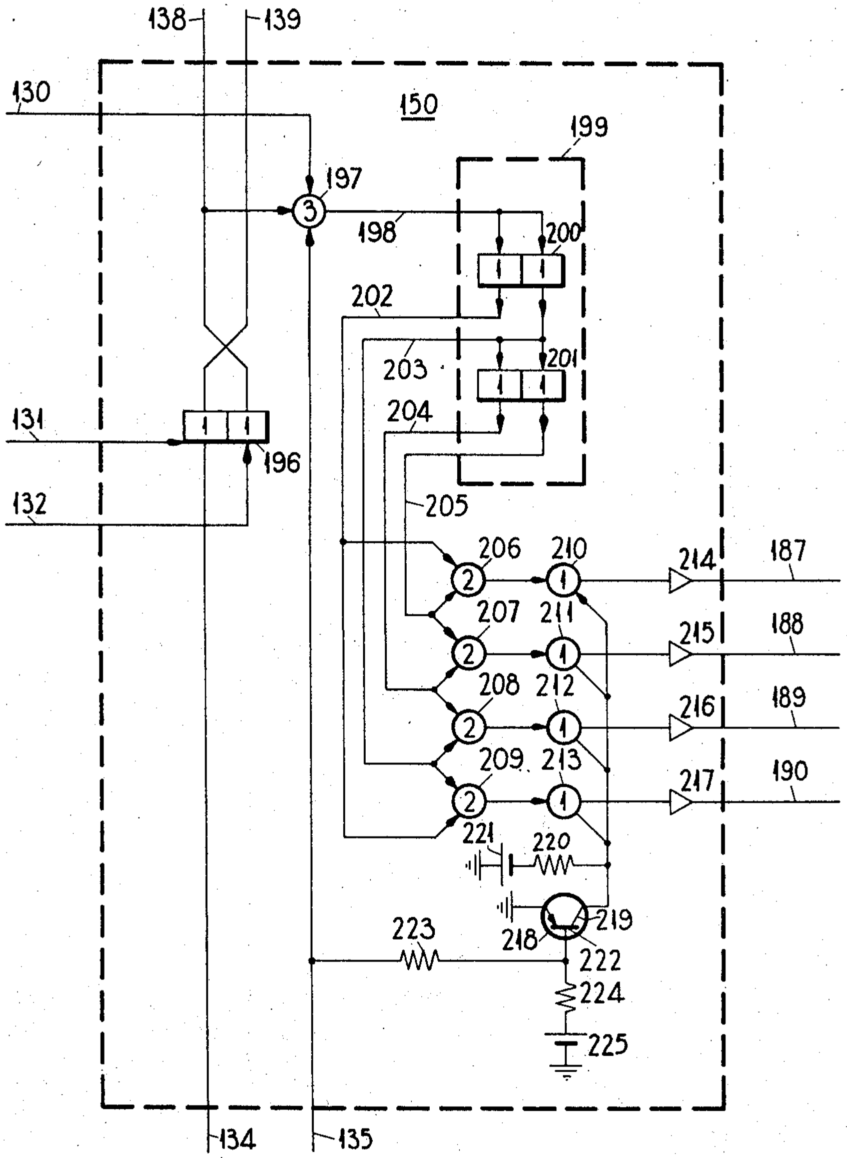
Figure 15:
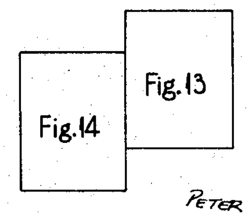
Figure 16:
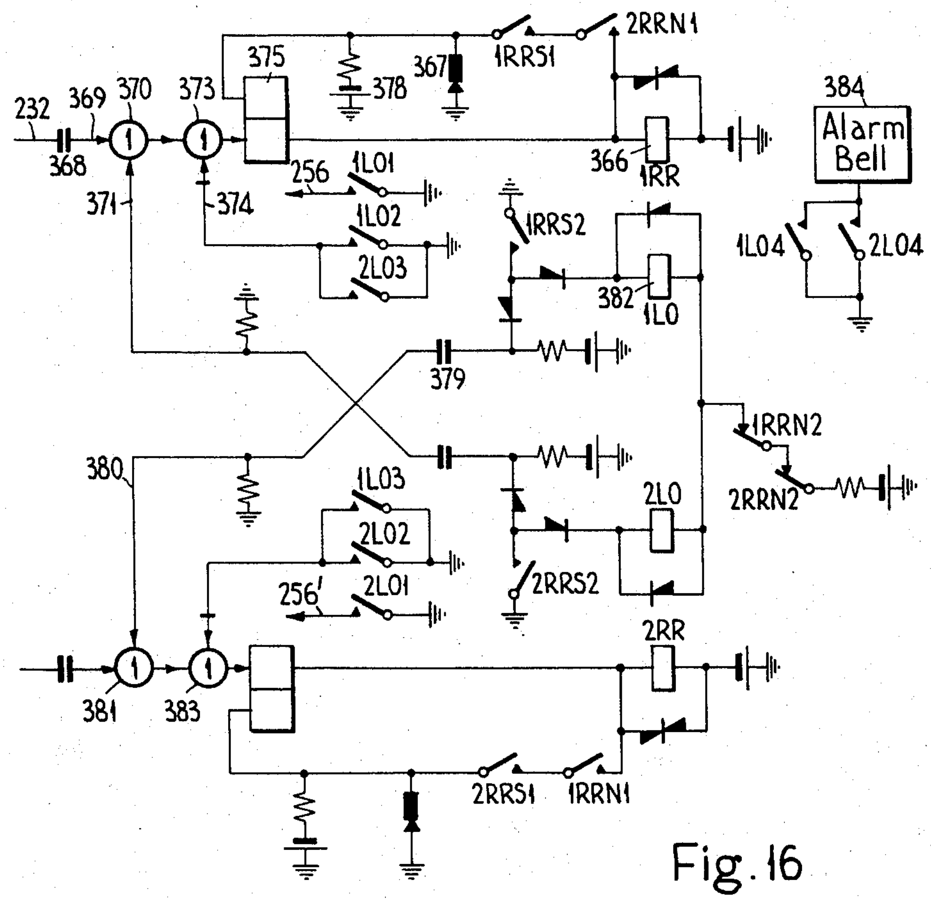
Figure 17:
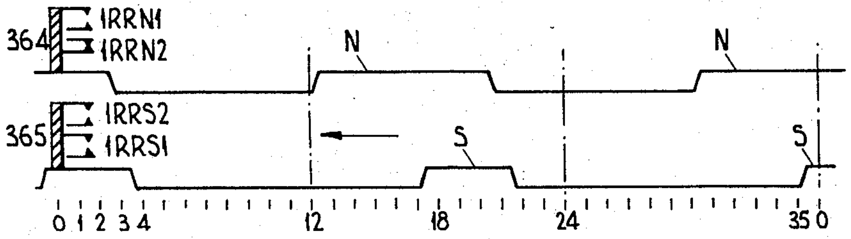

One embodiment of an automatic switching system in accordance with the present invention will now be described by way of example, with reference to the seventeen figures of the accompanying drawings in which:

FIGURES 1 to 5, when arranged as shown in FIGURE 6, show part of the switching system schematically, FIGURES 7 to 11, when arranged as shown in FIGURE 12, show part of the electric circuit of common control equipment of the switching system, FIGURES 13 and 14, when arranged as shown in FIGURE 15, show the electric circuit of a link selector of the switching system, and FIGURES 16 and 17 relate to fault evaluating equipment of the switching system.

Referring to FIGURES 1 to 6, the automatic switching system comprises part of an automatic telephone exchange wherein its function is to provide exclusive connections from line circuits of the exchange which are connected to input paths 1, 2, 3, 4 and the like of the system and of which only the line circuit 5 is shown, to relay sets of the exchange which are connected to output paths of the system such as the output paths 6, 7 and 8, and of which only the relay sets 9, 10 and 11 are shown.

More precisely, the switching system is arranged, as will be hereinafter described, so that the line circuits 5 and the like of subscribers wishing to make telephone calls are selected one at a time and each selected line circuit is connected by the switching system for preference to a free relay set like the relay sets 10 and 11 which are connected to outgoing junction circuits 12 and 13 of the exchange or, if none of these relay sets can be reached, to a relay set like the relay set 9 which can be used only for telephone calls to other subscribers of the exchange. In this respect the exchange is adapted to serve only one thousand subscriber's lines such as the line 98 and it is assumed that the majority of telephone calls originating over these lines will be for other telephone exchanges accessible over the outgoing junction circuits 12, 13 and the like.

When a calling subscriber has his line circuit 5 selected and connected through the switching system to one of the relay sets 9, 10, 11 he receives "dialling" tone. The switching system is further arranged, as will be hereinafter described, so that if this subscriber then dials the directory number of another subscriber on the present exchange, the connection is released and another connection is set up through the system to one of the relay sets 9 in the inter-digit pause following the one or more dialled digits that designate the exchange of the wanted subscriber.

Connected between the input paths 1 and 4 and the output paths 6, 7, 8 of the system are three serially connected switching stages through which said connections are set up and which each comprises a plurality of switching assemblies having like limited availability. The blocks labeled "A," "B," and "C" represent respectively switching assemblies which belong to the first, second and last switching stages in the series and which are hereinafter referred to as "A switches," "B switches" and "C switches." Three link selectors 14, 15 and 16 are associated with the three switching stages respectively and are arranged, as will be hereinafter described, to determine a route through those switching stages for the connection of any particular one of the input paths 1 to 4 of the system to a free output path 6, 7, 8 of the system. The operation of the link selectors 14, 15 and 16 to determine such a route and of the appropriate switching assemblies to establish the connection over that route are controlled and supervised by either one of two identical common control equipments of which only the control equipment 17 is shown.

As will be hereinafter described, the control equipments normally are used alternately each to effect the setting up of a predetermined number of consecutive connections through the switching stages, but if any connection cannot be set up a second attempt is made with the aid of the other control equipment. Each failure to set up a connection is recorded against the contol equipment in use at the time and the existence of a fault in either control equipment is ascertained automatically by comparison of the number of such failures recorded against each control equipment.

The input paths 1 to 4 of the system comprise the input paths of the said A switches. The connections between the output paths 18, 19, 20, 21 and the like of these A switches and the input paths 22, 23, 24, 25 of the said B switches are provided by signalling links 26, 27, 28, 29 which subsequently are referred to as "A links." Similarly the output paths 30, 31, 32, 33 of these B switches are connected to the input paths 34, 35, 36 and the like of the said C switches over signalling links which are hereinafter referred to as "B links" and of which only the links 37 are represented. The output paths 6, 7, 8 of the system comprise signalling links which are hereinafter referred to as "C links" and are connected to the output paths 38, 39, 40 and the like to the said C switches.

Up to four of the said A switches are associated with each said B switch the resulting arrangement being hereinafter referred to as an "A group." Four such A groups 41, 42, 43 and 44 are shown. All four of these A groups 41 to 44 have the output paths 30 to 33 of their B switches connected to the same plurality of B links 37, such an arrangement being hereinafter referred to as a "B group." The said C switches also are divided into groups which are hereinafter referred to as "C groups" and in each of which all the C switches have their output paths 38, 39, 40 connected to the same plurality of C links 6, 7, 8. Three such C groups 45, 46 and 47 are shown. The number of B groups and the number of C groups provided depend upon the required traffic capacity. In the present switching system there are ten B groups and six C groups.

Each said B group has its B links, for example the B links 37, connected to four of the said C switches belonging respectively to four of the said C groups 45, 46, 47 of the switching system. It is arranged that in each case two of these four C groups are associated with relay sets such as the relay set 9 and the other two C groups are associated with relay sets such as the relay sets 10 and 11.

Each A switch, each B switch and each C switch comprises thirteen input paths, thirteen output paths and fifty-two reed relays (not shown) which are each associated with a different combination of one input path and one output path of that switch. It is arranged that each input path thus is associated with four output paths and that each output path is thus associated with four input paths. Each input path, each output path and hence each signalling link 6, 7, 8, 26, 27, 28, 29, 37 of the switching system has four conductors (not shown) which are hereinafter referred to individually as the "positive wire," the "negative wire," the "holding wire" and the "private wire." Each input path and each signalling link also has a fifth conductor (not shown) which its hereinafter referred to as the "marking wire." Each said reed relay has four sets of normally open contacts (not shown) and an energizing winding (not shown). Three of these sets of contacts are connected between the positive wires, negative wires and private wires respectively of the associated input path and output path. The fourth set of contacts is connected in series with the relay winding and the resulting series circuit is connected between the said holding wires of the associated input path and output path. A rectifier element (not shown) joins the connection between these contacts and this winding to the said marking wire of the associated input path so that this winding is between this marking wire and the holding wire of the associated output path. The rectifier element is poled to present a low impedance to conventional current flow from the said connection to this marking wire.

The said A groups are associated respectively with a plurality of identical connector networks such as the networks 48, 49, 50 and 51 that are associated with the A groups 41, 42, 43 and 44 respectively. Each of these connector networks, for example, the connector network 48, is connected by thirteen conductors 52 to the thirteen private wires respectively in the associated A links 26, and by thirteen conductors 53 to the link selector 14. These conductors 53 also are connected to every other A group connector network 49, 50, 51 in the switching system. The connector network 48 includes a plurality of reed relays (not shown) which, when operated connect the thirteen conductors 52 to the thirteen conductors 53 respectively. These relays are controlled over a conductor 54 that is connected to every line circuit which, like the line circuit 5, is associated with the A group 41. Every A group connector network 48, 49, 50, 51 is connected to the link selector 14 and to each common control equipment 17 by a conductor 55.

A link marking circuit 56 is associated with every A group 41, 42, 43, 44 of the switching system. Thirteen conductors 57 connect this marking circuit 56 to the thirteen marking wires respectively in the "A" links 26 of every first "A" group in the said "B" groups. Corresponding pluralities of conductors 58, 59 and 60 similarly connect the marking circuit 56 to the marking wires in the A links 27, 28, 29 of every second, third and fourth A group in the said B groups. Conductors 61, 62, 63 and 64 respectively connect the marking circuit 56 to the connector networks associated with the first, second, third and fourth A groups in the said B groups.

Thirteen reed relays (not shown) in the marking circuit 56 have their energising windings connected between thirteen conductors 65 respectively that extend to the link selector 14 and a conductor 66 that extends to the common control equipment 17 and this link selector. Each of these relays has four sets of normally open contacts (not shown) that are connected respectively between the conductors 61, 62, 63 and 64 and four corresponding conductors belonging one to each of the pluralities of conductors 57, 58, 59 and 60.

The said B groups are associated with a plurality of identical connector networks such as the network 67 that is associated with the B group shown. Each of these connector networks, for example, the network 67 is connected by thirteen conductors 68 to the thirteen private wires respectively in the associated B links 37, and by thirteen conductors 69 to the thirteen marking wires respectively in those B links. The connector network 67 is connected to the link selector 15 by thirteen conductors 70 and by a further thirteen conductors 71 all of which conductors are also connected to every other B group connector network (not shown) in the switching system.

The connector network 67 includes a plurality of reed relays (not shown) which, when operated, connect the thirteen conductors 68 to the thirteen conductors 70 respectively. These relays have their energising windings (not shown) connected between conductors 72 and 73. The connector network 67 includes a further plurality of reed relays (not shown) which have their energising windings (not shown) connected between conductors 74 and 75 and which, when operated, connect the thirteen conductors 69 to the thirteen conductors 71 respectively. The conductors 72 and 74 are each connected to the four A group connector networks 48, 49, 50 and 51 of the A groups 41, 42, 43 and 44 which form the B group of the connector network 67. The conductors 73 and 75, and also conductors 76 and 77, connect every B group connector network 67 to the common control equipment. The first mentioned plurality of reed relays in the connector network 67 are arranged, when operated, to connect the conductor 76 to each of the conductors 78 and 79 and to connect the conductor 77 to each of the conductors 80 and 81.

The said C groups are associated respectively with a plurality of identical connector networks such as the networks 82, 83 and 84 that are associated with the C groups 45, 46 and 47. Each of these connector networks, for example, the connector network 82, is connected by thirteen conductors 85 to the thirteen private wires respectively in the associated C links 8 and by thirteen conductors 86 to the thirteen marking wires respectively in these C links. The connector network 82 is connected to the link selector 16 by thirteen conductors 87 and by a further thirteen conductors 88, all of these conductors being connected to the other C group connector networks 83, 84 in the system. The connector network 82 includes a plurality of reed relays (not shown) which, when operated, connect the thirteen conductors 85 to the thirteen conductors 87 respectively. These relays have their energising windings (not shown) connected between the conductors 78 and 89. The corresponding relays in the connector network 83 are connected between the conductors 80 and 89 while those in the connector network 84 are connected between the conductors 81 and 90.

Each C group connector network 82, 83, 84 in the switching system includes a further plurality of reed relays (not shown) which have their energising windings connected between a conductor 91 and the same one of the conductors 78, 79, 80 and 81 that is connected to the first mentioned plurality of relays in that connector network. These further relays are arranged, when operated, to connect the thirteen conductors 86 to the thirteen conductors 88 respectively and to connect a conductor 92 through a resistor (not shown) to a power supply lead (not shown) which is at a negative voltage, say 50 volts, to earth potential. The conductors 89, 90, 91 and 92 extend to the common control equipment 17.

The switching system includes a marker 93 which is connected by thirteen conductors 94 to thirteen input terminals respectively of the A link selector 14. Thirteen conductors 95 interconnect thirteen output terminals of the link selector 14 and thirteen input terminals respectively of the link selector 15. Thirteen conductors 96 similarly interconnect the link selectors 15 and 16 and a further thirteen conductors 97 connect thirteen output terminals of the link selector 16 to each common control equipment 17.

The marker 93 includes an individual reed relay (not shown) for each subscriber's line of the telephone exchange, such as the line 98 connected to the line circuit 5. These relays are arranged in ten matrices (not shown) each comprising a hundred relays arranged in a ten-by-ten array. The relays in any one of these matrices all are associated with subscriber's lines having the same value, for the hundred's numerical digit in the exchanging scheme. The ten relays in any one row of this matrix are associated with subscriber's lines having the same value for the tens numerical digit in the exchange numbering scheme and the ten relays in any one column of this matrix are associated with subscriber's lines having the same value for the units numerical digit. The selection of any one matrix is obtained by supplying an electric signal to an associated one of ten conductors 100. The operation of any one reed relay in this matrix is obtained by also supplying electric signals to the appropriate one of ten conductors 101 associated with the ten rows respectively in each matrix and to the appropriate one of ten conductors 102 associated with the ten columns respectively in each matrix.

Each relay in the marker 93 has four sets of normally open contacts (not shown) of which one set is connected between earth potential and one of the conductors 94 that corresponds, as will be hereinafter described, to the particular input path 1, 2, 3, 4 or the like of the switching system that is connected to the line circuit which serves the subscriber's line associated with this relay. This line circuit, for example, the line circuit 5 is connected via conductors 103 and 104 to two more sets of contacts of this relay and thence to each common control equipment 17 via conductors 105 and 106 respectively. The fourth set of contacts of this relay is connected between a conductor 107 which extends to each common control equipment 17, and a negative potential D.C. power supply.

The conductors 100, 101 and 102 are connected to a plurality of registers of which only the register 108 is shown. Each register, for example, the register 108 is connected by conductors 109, 110, 111, 112, 113, 114, 115, 116, 117 and 118 to each common control equipment 17, is connected by two conductors 119 to two parts (not shown) respectively of a register scanning circuit 120 and by an individual one of a plurality of signalling paths 121 to a plurality of switches 122 of the exchange through which any relay set 9, 10, 11 can be connected to any register. Each common control equipment 17 is connected to a different one of the said two parts of the register scanning circuit 120 by an individual conductor such as the conductor 123.

The switching system further includes a translator 124 and an allotter 125 which is adapted to allot to this translator any register that is free for use in setting up a connection through the switching stages of the switching system. This translator 124 comprises a ferrite core matrix (not shown) having three rows of five cores each, one row for the units digit, one row for the tens digit and one row for the hundreds digit of the exchange numbering scheme. Output signals obtained from the five cores in the hundreds, tens or units row are respectively supplied over five conductors 126, 127 or 128 respectively to the register 108 then allotted to the translator 124 by the allotter 125. Each line circuit of the exchange, for example, the line circuit 5 is connected to the translator 124 by a unique conductor 129 which is coupled inductively with two cores in each of the said three rows of ferrite cores that correspond in predetermined manner to the values of the hundreds, tens and units numerical digits of the telephone number allocated to the associated subscriber's line 98.

Each common control equipment 17 is connected to each of the link selectors 14 and 15 by each of four conductors 130, 131, 132 and 133 and to the link selector 16 by each of the conductors 130, 131 and 132. The link selector 14 also is connected to each common control equipment 17 by a pair of conductors 134 and 135 and a conductor 136. The connections 55, 134, 135 and 66 to the link selector 14 correspond respectively to connections 137, 138, 139, 140 and 141 to the link selector 15 and also to connections 142, 143, 144, 145, and 146 to the link selector 16. This last link selector 16 is connected to each common control equipment 17 by further conductors 147 and 148.

The link selectors 14, 15 and 16 have substantially the same electrical circuit, the circuit of the link selector 14 being shown in FIGURES 13 to 15 to which reference now should be made. This circuit comprises a supervisory network 149, a selecting network 150 and thirteen reed relays of which only the relays A, B, C and N are shown. The supervisory network 149 has thirteen input terminals 151 and thirteen output terminals 152 that comprise respectively the aforementioned input terminals and output terminals of the link selector 14 to which are connected the conductors 94 and 95 respectively. Each output terminal 152 is connected in the supervisory network 149 to a different one of thirteen identical output circuits 153 of which only the output circuits **153*a*, 153*b*, 153*c* and 153*n*** are shown.

Each output circuit, for example, the output circuit **153*a* comprises an OR-gate 154 having four input paths 155, 156, 157 and 158 and an output path 159, and an AND-gate 160 having two input paths 161 and 162 and an output path 163. The output path 159 of the gate 154 is connected to the input path 161 of the gate 160 via an electric amplifier 164. The other input path 162 of the gate 160 is connected to the output path 165 of an OR-gate 166 which has an input path 167 connected to the conductor 133 and a second input path 168 connected to an associated one 53*a* of the thirteen conductors 53. The output path 163 of the gate 160 is connected to the associated output terminal 152*a* via an electric amplifier 169 and a rectifier element 170 in series and also to one end of the winding 171 of the relay A via the amplifier 169 and a rectifier element 172 in series. Each of the thirteen relays A to N is associated in this way with a different one of the output circuits 153. The other end of the winding 171 is connected to the conductor 66** which is similarly connected to each of the relays B to N.

The input paths 155 to 158 of the gate 154 are connected to the output paths 173, 174, 175 and 176 of four AND-gates 177, 178, 179 and 180 respectively. Fifty-two of these AND-gates 177 to 180 and the like are provided in four groups of thirteen each and each output circuit 153 is connected to an individual gate in each of these groups. The input paths 181, 182, 183 and 184 of the gates 177 to 180 are each connected in predetermined manner to be hereinafter described to a different one of the input terminals 151. The other input path 185 of the gate 177 and the corresponding input path of every other AND-gate 186 and the like in the same group are connected over a conductor 187 to the selecting network 150. The other three groups of the AND-gates are similarly connected to the selecting network 150 over conductors 188, 189 and 190 respectively.

There is an identical relationship between the conductors 53 and the output paths of every A switch in the switching system such that each output circuit 153 and therefore each output terminal 152 corresponds to a different one of the output paths of each A switch. Each input terminal 151 is arranged to correspond to a different one of the input paths of each A switch in the switching system. In this respect these A switches are identical so that corresponding input paths are associated with corresponding output paths. Any particular one of the input terminals 151 is connected to four of the AND-gates 177 to 180 and the like that are in turn connected to the four output circuits 153 which correspond to the four output paths of any A switch associated with the input path of this switch that corresponds to this particular one of the input terminals. For example, let it be assumed that the output terminals **152*a*, 152*b*, 152*c* and 152*n* correspond to the four output paths of any A switch that are associated with the input path of this switch which corresponds to the input terminal 151*b*. This input terminal 151*b* is connected to, say, the input paths 183, 191, 192 and 193 of the AND-gates 179, 186, 194 and 195 which are in turn connected to the output terminals 152*a*, 152*b*, 152*c* and 152*n*. The AND-gates that are connected to any one of the input terminals 151** each belong to a different one of the four groups of such gates.

In the selecting network 150, a bi-stable circuit 196 is arranged to be controlled by the common control equipment 17 (FIGURES 1 to 6) over the conductors 131, 132 and 134 and to supply a predetermined signal to the conductors 138 and 139 in its two states respectively. An AND-gate 197 has three input paths connected to the conductors 130, 135 and 138 respectively and an output path 198 connected to a binary counting circuit 199. This counting circuit 199 comprises two bi-stable circuits 200 and 201 connected in cascade with their output circuits connected to four conductors 202, 203, 204 and 205. Four different combinations of two of these conductors 202 to 205 are connected to four AND-gates 206, 207, 208 and 209 respectively which in turn are connected to the conductors 187 to 190 respectively. Each connection between one of the AND-gates 206 to 209 and one of the conductors 187 to 190 includes an OR-gate 210, 211, 212 or 213 in series with an electric amplifier 214, 215, 216 or 217.

A p-n-p type junction transistor 218 which is connected in a grounded emitter configuration, has its collector electrode 219 connected to each of the OR-gates 210 to 213 and via a resistor 220 to the negative terminal of a battery 221 which has its positive terminal earthed. The base electrode 222 of the transistor 218 is connected via a resistor 223 to the conductor 135 and via a resistor 224 to the positive terminal of a battery 225 which has its negative terminal earthed.

Each of the relays A to N, for example, the relay A has a set of normally open contacts A1 connected between an associated one 65*a* of the thirteen conductors 65 and the conductor 55. Another set of normally open contacts A2 of this relay A are connected in series with an individual resistor 226 and the resulting series circuit is connected between the positive terminal of a battery 227 which has its negative terminal earthed, and the conductor 136. Had the link selector under consideration been the link selector 16, each of the relays A to N would be provided with a third set of normally open contacts A3 to N3 connected, as shown in broken line to the conductor 148.

The electric circuits of the two common control equipments in the switching system are identical, part of the circuit of the control equipment 17 (FIGURES 1 to 6) being shown in FIGURES 7 to 12 to which reference now should be made. For the most part, the arrangement of this circuit will be clear from the subsequent description of its operation. Consequently only those portions of the circuit which require special mention will be described at this stage. In the circuit all relays are reed relays and each is referenced in the drawings with the same letter or letters as the electric contacts that it controls.

The connection of the control equipment 17 into circuit with the rest of the switching system is obtained by operating a relay C which controls a plurality of contacts C. The connection of the second control equipment (not shown) into circuit with the rest of the switching system is obtained by operating a corresponding relay (not shown) in that control equipment. Both of these relays are controlled by a bistable circuit so that only one is operated at any time. One half 228 of this bistable circuit is in the control equipment 17 and has a pair of conductors 229 and 230 which are cross connected to corresponding conductors (not shown) of the other half (not shown) in the said second control equipment. A portion of the circuit of the control equipment 17 that includes this half 228 of the said bistable circuit has further pairs of conductors 231 and 232, 233 and 234, 235 and 236, and 237 and 238 cross connected to corresponding pairs of conductors (not shown) in an identical portion (not shown) of the circuit of the said second control equipment.

In the half 228 of the said bistable circuit the conductor 230 is connected to one input path of an OR-gate 241 which has contacts L02 connected between a second input path and earth potential. The output path of the gate 241 and the conductor 231 are connected to two input paths respectively of an OR-gate 242 which has its output path connected via a voltage inverting amplifier 243 and the contacts PBF2 in series to the conductor 229. This conductor 229 is connected through the energising winding 239 of the relay C to a negative D.C. supply 240 for the control equipment 17. The various appearances of this supply 240 in the circuit are each depicted by a battery with its positive terminal earthed.

The contacts PBF2 and also contacts PBF1 and PBF3 normally are closed. Thus the relay PBF is for detecting a failure of a positive D.C. supply 273 for the control equipment 17 and normally is operated by that supply. Under these conditions, a negative voltage signal passed by the gate 242 and inverted by the amplifier 243 results in the application of earth potential to the conductor 229 and the operation of the relay C. Earth potential applied to the amplifier 243 via the gate 241 results in a negative voltage on the conductor 229 and the release of the relay C. The various appearances of the positive supply 273 in the circuit are each depicted by a battery with its negative terminal earthed.

Negative signals for operating the relay C are supplied to the conductor 231 from a control network (not shown) in the said second control equipment. Negative signals for operating the corresponding relay in that control equipment are supplied to the conductor 232 from an identical control network now to be described in the control equipment 17. The conductor 232 is connected to the output path of an OR-gate 244 which has conductors 245, 246 and 247 connected to three input paths respectively. Contacts MT02 are connected between the conductor 245 and the negative supply 240. A circuit comprising a pulse forming network 251 and contacts RC3 and FF2 all in series is connected between the negative supply 240 and the conductor 246. The conductor 247 is connected to a pulse counting circuit 361 which also is connected to a corresponding conductor (not shown) of the said second control equipment.

It is arranged that each time either control equipment is used in the setting up of a connection a pulse is supplied to the counting circuit 361. When the setting up of connections proceeds normally this counting circuit 361 supplies a negative voltage pulse to the conductor 247 when eight consecutive connections have been set up with the said second control equipment and supplies such a pulse to the corresponding conductor when eight consecutive connections have been set up with the control equipment 17. Thus it is arranged that normally the control equipments are used alternately each to set up eight consecutive connections.

It is arranged, as will be hereinafter described, that if during the setting up of a connection with, for example, the control equipment 17 a fault condition is encountered, relays FF, FAT and RC operate either as a consequence of the direct detection of that fault condition or as the result of a relay T0 operating after a predetermined interval of time from the engagement of the control equipment for setting up that connection. In case of failure of the relay T0 to operate in the latter circumstances a relay MT0 is arranged to operate after a longer predetermined interval of time from the engagement of the control equipment. Thus a fault condition results in the application of a negative signal to the conductor 232 either as the result of the operation of the relays FF and RC or as the result of the operation of the relay MT0, and the said second control equipment is brought into use in place of the control equipment 17. Also the said counting circuit is reset.

When a fault condition is encountered during the setting up of a connection a second attempt to set up that connection normally is made using the control equipment which then is brought into use. This facility is obtained by means of the portion of the circuit connected to the conductors 235 and 236 and the corresponding circuit portion (not shown) in the said second control equipment. Contacts FAT2 and SAB3 are connected in series between the conductor 236 and earth potential and the connection between these contacts is joined to the negative supply 240. A relay SAA is connected between the conductor 235 and earth potential. Normally the contacts SAB3 are open so that when the contacts FAT2 close as the result of a fault condition being encountered during use of the control equipment 17 a relay (not shown) corresponding to the relay SAA is operated. This initiates a second attempt at setting up the connection using the said second control equipment. The actual circuit operations which result from the operation of this relay are described later.

Either control equipment, but not both, can be "locked out" manually, all connections then being set up by means of the other control equipment. Also if a fault develops in either control equipment, this equipment is "locked out" automatically and an alarm is given. Both "lock out" facilities are obtained by means of the portion of the circuit connected to the conductors 233 and 234 and the coresponding circuit portion (not shown) in the said second control equipment. Use of either "lock out" facility results automatically in the second attempt facility being inhibited through the portion of the circuit that is connected to the conductors 237 and 238 and the corresponding circuit portion (not shown) in the said second control equipment.

A relay L0 has its energising winding 255 connected between the conductor 233 and a conductor 256. Manually operable contacts 257 are connected between the conductor 256 and earth potential. Fault evaluating equipment 362 is connected to the conductors 256 and 232 and also to the corresponding conductors of the said second control equipment. Contacts L01 are connected between the conductor 234 and earth potential and the contacts PBF1 are connected between this conductor and the negative supply 240. A relay SAB is connected between the conductor 237 and the negative supply and contacts SAA3 are connected between this conductor and earth potential. The contacts PBF3 and contacts L03 in series are connected between the conductor 238 and earth potential and the connection between these contacts is joined to the negative supply 240.

Manual "lock out" of the control equipment 17 is obtained by operating the contacts 257 to earth the conductor 256. The relay L0 now operates unless the corresponding relay (not shown) is already operated and unless the relay (not shown) corresponding to the relay PBF has released. The contacts L01 close to earth the conductor 234 and so prevent operation of the relay corresponding to the relay L0. The contacts L02 close and so cause a negative voltage to be applied to the conductor 229. Thus the relay C releases and the corresponding relay (not shown) operates. The contacts L03 close to earth the conductor 238 and so cause the operation of the relay corresponding to the relay SAB. Contacts (not shown) corresponding to the contacts SAB3 then close causing the conductor 235 to be earthed and so prevent operation of the relay SAA.

The electric circuit of the fault evaluating equipment 362 is shown in FIGURE 16 to which reference now should be made. This equipment includes two electromagnetic step-by-step switches 1RR and 2RR which are of the ratchet relay type and which are each associated with a different one of the two control equipments. The switches 1RR and 2RR are identical and are included in two identical portions respectively of the circuit. Therefore, only the switch 1RR which is associated with the control equipment 17 and the circuit portion including this switch will be described in detail.

The switch 1RR has two cams N and S of which the developments of the peripheries are illustrated in FIGURE 17 to which reference should also be made. The switch 1RR rotates these cams step-by-step in unison and in the direction indicated by the arrow 363. There are thirty-six possible angular positions of the cams which are indicated by the short vertical lines adjacent to the development of the cam S and of which the positions numbered 0 and 18 are hereinafter referred to as "start" positions. The cams N and S control contact springsets 364 and 365 respectively of the switch 1RR. The springset 364 comprises contacts 1RRN1 and 1RRN2 while the springset 365 comprises 1RRS1 and 1RRS2. The illustrated position of the cams N and S corresponds to both springsets 364 and 365 being actuated and all of the contacts 1RRN1, 1RRN2, 1RRS1 and 1RRS2 are shown in their actuated conditions. The switch 1RR has an energising winding 366 and interrupter contacts 367 which are opened when the winding 366 is energised.

As previously described, fault conditions which are encountered during use of control equipment 17 each results in the application of a negative signal to the conductor 232. This conductor 232 is connected via a capacitor 368 to an input path 369 of an OR-gate 370 which has a second input path 371. An occurrence of the said negative signal on the conductor 232 produces, through the capacitor 368, a pulse which is passed by the gate 370 to an inhibiting gate 373. Unless input path 374 of this gate 373 is earthed it passes this pulse to a bi-stable circuit 375 which is switched by the pulse and thereby earths a conductor 376. Thus the winding 366 of the switch 1RR is energised and the interrupter contacts 367 open causing the voltage of a conductor 377 to fall from earth to a relatively negative value determined by a battery 378. This fall in the voltage of the conductor 377 re-sets the bi-stable circuit 375 which disconnects earth from the conductor 376. Thus the winding 366 is de-energised so that the contacts 367 close to earth the conductor 377 and the cams N and S are rotated one step.

Let it be assumed that initially the cams N and S are in the said start position "0" as shown in FIGURE 17 and that the corresponding cams (not shown) of the switch 2RR are in their equivalent start position. After unsuccessful attempts to set up three connections with the aid of the control equipment 17 the cams N and S are in position "3." Consequently the springset 364 is normal so that the contacts 1RRN1 and 1RRN2 respectively are closed and opened. This springset 364 remains normal until the cams N and S are stepped to postion "13." At the fourth step of the cams N and S, the springset 365 restores to normal so that the contacts 1RRS1 and 1RRS2 closes. A capacitor 379 is discharged by the closing of the contacts 1RRS2 but the resulting positive-going voltage pulse on the conductor 380 is not passed by the gate 381. The springset 365 remains normal until the cams N and S are stepped to the second start position "18."

If, when the cams N and S have been stepped between four and twelve times, the corresponding cams (not shown) of the switch 2RR make their third step, the contacts 2RRN1 close and complete a circuit for energising the winding 366 via the interrupter contacts 367. Thus the switch 1RR steps the cams N and S until this circuit is broken by the opening of the contacts 1RRS1 when these cams reach the second start position "18." At this time the capacitor 379 is charged due to the opening of the contacts 1RRS2 and a negative going voltage pulse is applied to the conductor 380 and passed by the gate 381. Thus the switch 2RR is caused to step its cams (not shown) to their fourth position to close the contacts 2RRS1 and 2RRS2.

If the cams N and S are stepped thirteen times before the corresponding cams (not shown) of the switch 2RR make their third step a relay 1L0 has its winding 382 energised upon the closing of the contacts 1RRN2. The contacts 1RRS2 and the contacts 2RRN2 are closed at this time. When the relay 1L0 operates, its contacts 1L01 earth the conductor 256 to lock out the control equipment 17 in the manner previously described. The closing of its contacts 1L02 and 1L03 inhibit the gates 373 and 383 respectively to prevent further operation of the fault evaluating equipment. Its contacts 1L04 complete an operating circuit for an alarm bell 384.

Because of the second attempt facility, each fault condition outside the control equipments will usually result in the operation of each of the switches 1RR and 2RR. Occasions when such a fault condition results in the operation of only one of the switches 1RR and 2RR tend to be equally divided between these switches and the probability of either switch thus being operated thirteen times without the other switch thus being operated three times is very small. However, if either control equipment develops a fault, the associated switch 1RR or 2RR will certainly be operated thirteen times without being reset.

Returning to FIGURES 7 to 12, the conductors 245 and 246 are also connected to two input paths respectively of an OR-gate 248 which has its output path connected via a conductor 249 to a clock pulse generator 250. Further, the conductor 246 is connected to one input path of an OR-gate 252 which has another input path connected to a pulse generator 253. The output path of this gate 252 is connected to each of a plurality of conductors 254 in the circuit and also the three link selectors 14, 15 and 16 (FIGURES 1 to 6) over the conductor 132. The conductors 254 are connected to bistable circuits 258, 259, 260, 261 and 262. Thus it is arranged that when the control equipment 17 is in use, a fault condition also results in the supply of a negative voltage signal to the conductors 249, 254 and 132. Such a signal on the conductor 249 inhibits operation of the clock pulse generator 250. Such a signal on the conductor 132 resets any of the bistable circuits, such as the bistable circuit 196 (FIGURES 13 to 15) in the link selectors 14, 15 and 16 that have been switched. Such a signal on the conductors 254 resets any of the bistable circuits 258 to 262 that have been switched.

Normally the clock pulse generator 250 is supplying two series of clock pulses to the conductors 130 and 263 respectively. The pulses in each series recur every 330 microseconds. Each pulse supplied to the conductor 263 is of 20 microseconds duration. Each pulse supplied to the conductor 130 is of 10 microseconds duration and commences at the termination of a clock pulse of the other series.

The thirteen conductors 97 from the link selector 16 terminate in the control equipment 17 on thirteen input paths respectively of an OR-gate 264 which has its output path connected via a voltage inverting amplifier 265 to a conductor 266. The conductor 266 is connected to a bistable circuit 267 which is associated with a network 268 that controls the supply of electric signals to the conductors 76 and 77 that are connected to the B group connector networks 67. The conductors 263 and 266 are connected to the two input paths respectively of an AND-gate 269 which has its output path connected to the three link selectors 14, 15 and 16 over the conductors 131 and also to the bistable circuit 262 which controls the supply of electric signals to the link selector 14 over the conductors 134 and 135.

The conductors 136, 140 and 145 from the link selectors 14, 15 and 16 terminate in the control equipment 17 on input paths of three identical current sensitive gates 270, 271 and 272 respectively. Each of these gates, for example the gate 270, has a second input path between which and the positive supply 273 is a circuit comprising relay contacts MA1 and a resistor 274 in series. It is arranged that when the contacts MA1 are closed the particular value of current supplied to the gate 270 is substantially equal to the value of current that is supplied to this gate over the conductor 136 when any one of the relays A to N is operated in the link selector 14. The gate 270 is arranged to supply an output signal to a conductor 275 connected to its output path when the total current supplied to its input paths has two or more times this particular value, and not to supply the output signal when this total current is of this particular value. The gates 271 and 272 are similarly arranged in respect of their supply of output signals to conductors 276 and 277 respectively.

A current sensing network 278 is associated with the conductor 105 from the marker 93. This network 278 is adapted to supply electric current to a conductor 279 and to supply an output signal to a conductor 280 when this current is of a value within a predetermined range of values.

In order to consider the operation of the switching system, let it be assumed that a subscriber served by the line 98 lifts his telephone receiver (not shown) to originate a telephone call. At this time a free register, for example the register 108 is already allotted to the translator 124. In response to the looping of the line 98 the line circuit 5 supplies a pulse to the translator 124 over the conductor 129. Corresponding pulses are induced in combinations of the conductors 126, 127 and 128 that are characteristic of the identity of the line 98 in the exchange numbering scheme and this identity is stored in the register 108. The allotter 125 allots another free register to the translator 124 after a very short delay, for example, twenty microseconds.

The register 108 now earths the conductor 118 and supplies a signal to the conductor 114 to indicate that it requires the services of one of the control equipments. If either control equipment already is in use for setting up a connection, a relay in that control equipment, for example, the relay ST in the control equipment 17 (FIGURES 7 to 12) is operated and the application of earth potential to the conductor 118 is of no consequence at this stage. Also the signal supplied to the conductor 114 has no immediate effect. More than one of the registers of the system may require the services of one of the control equipments at this time.

When either control equipment completes the control and supervision of a set up, re-use of that control equipment is inhibited for an interval of 12 milliseconds while it restores to normal. Also a conductor in that control equipment, for example the conductor 353 in the control equipment 17 is earthed for a sufficient interval of time to ensure that the relay ST releases.

Let it be assumed that the control equipment 17 is connected into circuit with the rest of the switching system, the relay C being operated. This situation is indicated by a lamp 281. Since at least the register 108 is earthing the conductor 118, the relay ST reoperates when earth potential is disconnected from the conductor 353 as its winding 284 then is energised from the negative supply 240. The contacts ST1 then complete a circuit to energise the winding 285 of the relay MT0 via a delay network 286. The contacts ST2 complete an alternative circuit to energise the winding 284 of the relay ST. The delay network 286 is arranged so that the relay MT0 operates only if the contacts ST1 remain closed for at least 310 milliseconds.

At the end of the said 12 milliseconds interval, which is obtained by means of a delay network 282, the bistable circuit 258 is switched by the signal supplied to the conductor 114 by the one or more registers 108 requiring access to the control equipment. The switching of the bistable circuit 258 initiates simultaneously the selection of one of these registers and a preliminary operating sequence in control equipment 17. Thus a signal obtained from this bistable circuit is passed by an OR-gate 283 to the register scanner 120 over the conductor 123 and this scanner makes the selection. The selected register, for example, the register 108 connects itself to the conductors 109 to 113 and 115 to 117 causing the connection of a negative D.C. supply to the conductor 109.

The said preliminary operating sequence in the control equipment 17 commences with the release of the relay RC and the operation of a relay PW. The contacts RC1, RC2 and RC3 have no function at this stage. The contacts PW1 complete circuits for energising the windings 287 and 288 of relays HA and PY. The contacts PW3 complete a circuit for energising the winding 289 of the relay T0 via a delay network 290 which delays the operation of this relay for 155 milliseconds. The contacts PW4 complete circuits between each of the conductors 109 and 110, and earth potential via the windings 291 and 292 of relays OR and CHH respectively. The contacts PW5 complete a circuit for a lamp 293 which lights to show that the control equipment 17 is operating. The contacts PW2 and PW6 have no function at this stage.

The relay HA operates and its contacts HA1 connects the conductor 92 to a delay network 294. Its contacts HA2 complete a circuit between the conductor 147 and the negative supply 240 via the winding 295 of a relay MK.

The relay PY operates and its contacts PY1 earth the conductors 111 and 112 while its contacts PY2 connect the negative supply 240 to the conductor 113. When the register 108 is selected, these potentials cause the identity of the calling line 98 stored in this register to be indicated to the marker 93 by electric signals on one each of the ten conductors 100, the ten conductors 101 and the ten conductors 102 and the relay (not shown) in the marker that is characteristic of the line 98 is operated.

Upon both the selection of the register 108 and the operation of the relay PW, the relay OR operates and its contacts OR1 complete a circuit for energising the winding 296 of a relay OG. This relay OG operates and its contacts OG1 complete a circuit for energising the winding 297 of a relay ISA. The contacts OG2 connect the negative supply 240 to the conductor 89. The contacts OG3 prepare a circuit for energising the winding 298 of a relay NJ and the contacts OG4 complete a circuit for energising the winding 299 of a relay IS.

The relay ISA operates and its contacts ISA1 connect the negative supply 240 to the conductor 73. The contacts ISA2 connect the negative supply 240 to an input path 300 of an AND gate 301. The contacts ISA3 connect the conductor 142 to earth via a rectifier element 302. The contacts ISA4 have no function at this stage and the contacts ISA5 earth the conductor 148.

The relay IS operates and its contacts IS1 connect the negative supply 240 to input paths 303 and 304 of two AND-gates 305 and 306 respectively. At this time, a voltage inverting amplifier 307 is supplying a negative potential to an input path 308 of an AND gate 309, a voltage inverting amplifier 310 is earthing input paths 311 and 312 of the gates 301 and 305, a voltage inverting amplifier 313 is earthing an input path 314 of the gate 306, a voltage inverting amplifier 315 is supplying a negative potential to an input path 316 of the gate 301, and a voltage inverting amplifier 317 is earthing an input path 318 of the gate 309. A bistable circuit 319 connected to the output path of the gate 301 is in its normal state so that a voltage inverting amplifier 320 is supplying a negative potential to an input path 321 of the gate 306.

With the operation of the said relay in the marker 93, one of the thirteen conductors 94, for example, the conductor **94*b* (FIGURES 13 to 15) is earthed, this conductor 94*b* corresponding to the input path 1 that is connected to the line circuit 5. The conductors 103 and 104 are connected to the conductors 105 and 106 respectively and a negative D.C. supply is connected to the conductor 107. In the line circuit 5 a line relay (not shown) has operated in response to the looping of the line 98 and in consequence the conductor 103 is connected to earth potential via a resistor (not shown). Therefore the conductor 105 has a voltage of value between earth and that of the negative supply 240**.

The negative potential applied to the conductor 107 is applied to the amplifier 307 after an interval of 4 milliseconds obtained by means of a delay network 322. The amplifier 307 then applies earth to the amplifier 310 and to the input path 308 of the gate 309. The amplifier 310 consequently supplies a negative potential to the input paths 311 and 312 of the gates 301 and 305. An output signal results from the gate 301 which causes the bistable circuit 319 to switch.

Had the wrong relay operated in the marker 93 either earth or a relatively negative potential substantially equal to that of the supply 240 would appear on the conductor corresponding to the conductor 103 and hence on the conductor 105 depending upon whether the line circuit associated with this relay was busy or free. If earth appears on the conductor 105, the amplifier 313 causes a negative potential to be applied to the input path 314 of the gate 306 and the amplifier 315 cause the potential of the input path 316 of the gate 301 to rise to earth. Consequently the gate 306 provides an output signal which causes the relay FF to operate and which is supplied to an associated one of a plurality of fault recorders 323. Also the gate 301 is prevented from supplying an output signal to switch the bistable circuit 319.

When the relay FF operates its contacts FF1 complete a circuit for energising the winding 325 of the relay FAT. The contacts FF2 prepare a circuit for energising the pulse forming network 251. The relay FAT operates and the contacts FAT1 connect the negative supply 240 to a delay network 326 so that after a delay of 11 milliseconds the winding 327 of a relay RA is energised. The contacts FAT2 close to effect the operation of the relay (not shown) which corresponds to the relay SAA and so initiate a second attempt at setting up the required connection with the aid of the said second control equipment. The actual circuit operations which result from the operation of this relay correspond to the circuit operations which result from the operation of the relay SAA and are described later. The operation of the relay RA produces a sequence of circuit operations which result in a restoration of the control equipment 17 to its quiescent condition and are described later.

If a negative potential substantially equal to that of the supply 240 appears on the conductor 105, the gate 305 supplies an output signal to switch an associated bistable circuit 328 and thereby cause a relay FA to operate. The contacts FA1 then connect earth potential to an associated one of the fault recorders 323 and complete an energising circuit for the winding 324 of the relay FF. The relay FF then operates with the results described above.

Had none of the relays (not shown) in the marker 93 operated, the relay T0 would eventually operate, its contacts T01 then connecting earth potential to an associated one of the fault recorders 323 and completing an energising circuit for the winding 324 of the relay FF.

It has been assumed that the correct relay (not shown) in the marker 93 is operated, this being, of course, the usual state of affairs. The bistable circuit 319 switches thereby causing the supply of an input signal to one input path 329 of an AND-gate 330.

In the line circuit 5 a connection (not shown) exists between the conductor 104 and the conductor 54 such that when the operated marker relay (not shown) connects together the conductors 104 and 106 the relays (not shown) operate that are in the connector network 48. These relays connect the thirteen private wires of the A links 26 via the conductors 52 and 53 to the link selector 14. These relays also earth the conductors 72 and 74, thereby selecting the B group connector network 67, and connect the conductor 55 to the conductor 61.

Because the conductors 72 and 74 are earthed while the conductors 73 and 75 are connected to the negative supply 240 in the control equipment 17 both of the said pluralities of relays (not shown) in the connector network 67 now operate. Thus the private wires and marking wires of the B links 37 are connected through the conductors 68 and 70, and 69 and 71 respectively to the link selector 15. Also the conductor 76 is connected to the conductors 78 and 79 while the conductor 77 is connected to the conductors 80 and 81.

At this time, the conductor 76 is at earth potential and the conductors 77, 89 and 91 are at relatively negative potentials. Consequently both of the said pluralities of relays (not shown) in the C group connector network 82 now operate. Thus the private wires and the marking wires of the C links 8 are connected through the conductors 85 and 87, and 86 and 88 respectively to the link selector 16. Also a negative supply is connected to the conductor 92 thereby indicating to the control equipment 17 that the relays (not shown) in one A group connector network 48, one B group connector network 67 and one C group connector network 82 have operated.

In the control equipment 17, the normal state of the bistable circuit 262 is such that earth and a relatively negative potential are applied to the conductors 135 and 134 respectively. In the link selectors 14, 15 and 16 the normal state of the bistable circuit 196 and the like is such that the conductors 139, 144 and 147 are at earth potential while the conductors 138 and 143 are at a relatively negative potential.

It is arranged that a negative potential to earth is applied to the private wire of any A link, any B link or any C link of the switching system that is free for use in providing a connection through the switching stages. It is also arranged that earth potential is applied to the private wire of any A link, any B link or any C link of the switching system that is busy, that is to say, is incorporated in a connection already set up through the said switching stages.

In each link selector, for example, the link selector 14 (FIGURES 13 to 15) the transistor 218 is substantially non-conducting due to the presence of earth potential on the conductor 135. Consequently negative input signals are supplied to each of the gates 210 to 213. The corresponding negative output signals obtained from these gates 210 to 213 are amplified and inverted by the amplifiers 214 to 217 to provide earth potential on each of the conductors 187 to 190 and hence on one input path of each of these fifty-two AND-gates 177 to 180 and the like. The input paths 183, 191, 192 and 193 of the gates 179, 186, 194 and 195 also are earthed at this time as they are connected to the conductor 94$b$. Therefore only each of these four AND-gates, for example, the gate 179, provides an output signal which is passed by the associated OR-gate 154 and then amplified and inverted by the amplifier 164 to provide a negative potential to earth on the input path 161 of the associated AND-gate 160. If the particular A link 26 that now has its private wire connected to the gate 160 is free, an output signal is obtained from this gate and is applied to the amplifier 169 which causes earth potential to be applied to the conductor 95$a$ via the output terminal 152$a$ and to the winding 171 of the relay A.

Because the A links 26 now are associated with the link selector 14, they each correspond to a different one of the conductors 95 and the four output terminals 152$a$, 152$b$, 152$c$ and 152$n$ of this link selector correspond to the four output paths 18 of the A switch 331 that are associated with the particular input path 1 of this A switch that is connected to the calling subscriber's line circuit 5. Therefore the particular ones, if any, of the conductors 95 which are earthed in the above way indicate the particular A links 26 that are connected to the free ones of these four output paths 18.

By a similar process to that described above, earth potential appears on those of the conductors 96 which now correspond to the particular ones of the B links 37 that are both free and accessible from these particular A links 26. By the same process, earth potential appears on those of the conductors 97 which now correspond to the particular ones of the C links 8 that are both free and accessible from these particular ones of the B links 37.

The application of earth potential to the common control equipment 17 over one or more of the conductors 97 indicates that an exclusive connection can be set up from the calling line 98 to one of the relay sets 11 connected to the C links 8. If such a connection can be set up, the said indication is obtained within 4 milliseconds of the operation of the said relays (not shown) in the C group connector network 82 and hence of the application of negative potential to the conductor 92.

If the said indication is not obtained within the interval of the delay of 4 milliseconds provided by the delay network 294 the network 268 changes the potentials on the conductors 76 and 77 from earth and a relatively negative potential to the negative potential and earth respectively. The operated relays (not shown) in the C group connector network 82 releases whereafter the corresponding relays (not shown) in the C group connector network 83 operate to associate the C links 7 with the link selector 16 in place of the C links 8 and to cause the re-application of the negative potential to the conductor 92.

The continued absence of the said indication for a further 4 milliseconds shows that it is not possible to set up a connection to a relay set such as the relay sets 10 and 11 that are associated with outgoing junction circuits 12 and 13 of the exchange. In these circumstances, 4 milliseconds after the operation of the relays (not shown) in the connector network 83, the network 268 changes the potentials of the conductors 76 and 77 back to earth and the relatively negative potential respectively and causes the relays NJ and OE to operate. The relay OG then releases. In this way the operated relays (not shown) in the C group connector network 83 are caused to release and the corresponding relays (not shown) in the C group connector network 84 are subsequently caused to operate and connect the private wires of the C links 6 to the link selector 16 in place of the private wires of the C links 7.

If the said indication still is not obtained, the network 268 again changes the potentials of the conductors 76 and 77 and the fourth plurality of C links (not shown) accessible from the B links 37 is examined. In the unlikely event that the said indication still is not obtained, the network 268 again changes the potentials of the conductors 76 and 77 and causes the relay FF to operate with the results previously described.

It will be assumed that an exclusive connection can be set up from the line 98 to one or more of the relay sets 11 connected to the C links 8. Thus earth potential appears on one or more of the conductors 97 and causes the gate 269 to open for the passage of the clock pulses supplied to the conductor 263. Also the bistable circuit 267 is switched to a state in which it prevents the network 268 changing the potentials on the conductors 76 and 77 and in which it supplies a signal to the second input path 332 of the gate 330. Thus an output signal is obtained from the gate 330 and this output signal both causes a relay OPK to operate and an AND-gate 333 to provide an output signal at the end of the 4 millisecond delay provided by the delay network 294.

When the relay OPK operates, its contacts OPK1 complete a circuit between the conductor 105 and the current sensing network 278. The contacts OPK2 have no function at this stage. The current sensing network 278 supplies electric current over the conductors 105 and 103 to operate a cut-off relay (not shown )in the line circuit 5 and also supplies an output signal to the conductor 280 until it senses from a change in the value of the said current that the conductor 105 has been connected by the said cut-off relay to the private wire of the line circuit 5 and that earth potential is applied to this private wire. This output signal causes a bistable circuit 334 to switch and also inhibits an AND-gate 335 from passing an electric signal that is supplied to it over a conductor 336 when this bistable circuit switches.

When the gate 333 provides an output signal it permits the next clock pulse passed by the gate 269 to switch the bistable circuit 262 and so change the potentials applied to the conductors 134 and 135 to earth and a relatively negative potential respectively. In the link selector 14 (FIGURES 13 to 15) the transistor 218 conducts causing about earth potential to be applied to its collector electrode 219 and hence to the associated input paths of the gates 210 to 213. One of these gates, for example, the gate 210 continues to supply a negative potential signal as its associated AND-gate 206 is supplied with two such signals by the counting circuit 199. Earth potential can now only be applied to one or more of the conductors 97 via the single conductor 95$b$ and its associated AND-gate. It will be assumed that this does not occur.

With the change of potential on the conductor 135 the AND-gate 197 is able to pass the clock pulses supplied to the conductor 130. The counting circuit 199 is driven by these pulses and the four groups of AND-gates 177 to 180 are selected in sequence, one at a time. As it has been assumed that earth potential is not applied to any of the conductors 97, when the bistable circuit 262 switches the gate 269 is prevented from supplying further clock pulses to the conductor 131.

If, for example, the selection of the group of AND-gates that includes the gate 179 results in the re-application of earth potential to one or more of the conductors 97, the next clock pulse supplied to the conductor 263 by the pulse generator 250 is passed by the gate 269 to the bistable circuit 196 in the link selector 14. Because now the conductor 134 is at a negative potential to earth, the bistable circuit 196 switches and changes over the potentials applied to the conductors 138 and 139 so as to start a selecting process in the link selector 15 like that described above in respect of the link selector 14. Also the change in the potential of the conductor 138 prevents the AND-gate 197 from passing further clock pulses to the counting circuit 199.

In the above manner, each of the link selectors 14, 15 and 16 has one of its output terminals 152 selected to which earth potential is applied in consequence of the application of this potential from the marking circuit 93 over the conductor **94*b* to the input terminal 151*b* of the link selector 14. The completion of this selection is indicated by the change from earth to a negative potential on the conductor 147**.

In the control equipment 17 (FIGURES 7 to 12) this change in the potential applied to the conductor 147 causes the relay MK to operate. The negative supply 240 thus is connected to the conductors 66, 141 and 146 by the contacts MK1, MK2 and MK3 respectively and the contacts MK4 cause the relay MA to operate. This relay MA closes its contacts MA1, MA2 and MA3 which are associated with the current sensitive gates 270, 271 and 272 respectively.

In each link selector 14, 15 or 16, that one of the relays A to N is operated which is associated with the it has been assumed that the output terminal **152*a* of the it has been assumed that the output terminal 152*b* of the link selector 14 is selected. Since earth potential is obtained from the amplifier 169 and the negative supply 240 of the control equipment 17 is connected to the conductor 66 the relay A operates. Its contacts A1 connect the conductor 65*a* to the conductor 55. Its contacts A2 connect the conductor 136 to the positive supply 227 via the resistor 226. In the link selector 16, the operated relay (not shown) has contacts corresponding to one of the sets of contacts A3 to N3 that complete a circuit to hold this relay operated by current flowing over the conductors 148 and 145**.

The current sensitive gates 270, 271 and 272 provide a check that at least one relay is operated in each of the link selectors 14, 15 and 16. Thus only if this is the situation do all of these gates 270 to 272 provide input signals for an AND-gate 338 which controls the bistable circuit 259. Assuming the outcome of this check to be satisfactory, the bistable circuit 259 switches causing the relay MA to release and an input signal to be supplied to an AND-gate 339 which, at present, is inhibited by the output signal provided by an OR-gate 340 controlled by the gates 270 to 272.

The release of the relay MA initiates a check by the gates 270 to 272 that not more than one relay is operated in each of the link selectors. Thus if more than one relay is operated in any link selector the associated gate 270, 271 or 272 will continue to provide an input signal to the gate 340 thereby inhibiting the gate 339. Assuming the outcome of this check to be satisfactory, the output signal of the gate 340 goes upon the release of the relay MA and the gate 339 provides an output signal to operate the relay MB. This relay MB, through its contacts MB1 connects the positive supply 273 to the conductor 142.

Because the conductor **65*a* is connected to the conductor 55 by the contacts A1 of the operated relay A in the link selector 14, the relay (not shown) operates in the link marking circuit 56 that is connected between the conductors 65*a* and 66. This latter relay completes a circuit from earth potential in the control equipment 17 to the marking wire of a particular one of the A links 26 via the conductors 55 and 61 and one of the conductors 57. This particular one of the A links 26 corresponds to the conductor 95*a* which is connected to the selected output terminal 152*a* of the link selector 14**, and is referred to subsequently as the marked A link.

The operated relay (not shown) in the link selector 15 completes a circuit for earth potential in the control equipment 17 to the marking wire of a particular one of the B links 37 via the conductor 137, contacts of this relay, their associated one of the conductors 71 and the corresponding one of the conductors 69. This particular one of the B links 37 corresponds to that one of the conductors 96 which is connected to the selected output terminal of the link selector 15, and is referred to subsequently as the marked B link.

The operated relay (not shown) in the link selector 16 completes a circuit from the positive supply 273 in the control equipment 17 to the marking wire of a particular one of the C links 8 via the conductor 142, contacts of this relay, their associated one of the conductors 88 and the corresponding one of the conductors 86. This particular one of the C links 8 corresponds to that one of the conductors 97 which is connected to the selected output terminal of the link selector 16, and is referred to subsequently as the selected C link.

The relay set, for example, the relay set 11, that is connected to the marked C link is selected in response to the positive marking potential. This relay set 11 acknowledges its selection by interconnecting the marking wire and the holding wire of the marked C link and by causing its output path 343 to be connected by one of the switches 122 to that one of the signalling paths 121 which is connected to and indicated by the register 108. Earth potential then is returned by this register 108 to the private wire and the holding wire of the output path 343. The holding wire of the marked C link is connected in the relay set 11 to the holding wire of the output path 343 through a rectifier element (not shown) that is poled so as not to conduct in response to the said marking potential.

Although the application of earth potential to the private wire of the marked C link results, in the link selector 16, in the disappearance of this potential from the selected output terminal, the operated relay in this link selector does not release. This is because of the circuit between the conductors 146 and 148 for holding this relay operated.

In the C switch 342, the reed relay (not shown) operates that is connected between the holding wire of the marked C link and the marking wire of the marked B link 37. This relay connects its own winding (not shown) between the holding wires of these two links. Also it connects together the positive, negative and private wires respectively of these links. Consequently the private wires of the marked B link is earthed via the relay set 11 and the operated relay (not shown) in the link selector 15 is caused to release thereby disconnecting the earthed conductor 137 from the marking wire of this B link.

The operated relay (not shown) in the C switch 342 does not release as its winding now is connected to earthed marking wire of the marked A link via the holding wire of the marked B link and the winding of a reed relay (not shown) in the B switch 341. The latter relay operates with similar results to those described above for the operated relay in the C switch 342. Thus the private wire of the marked A link is earthed via the relay set 11 and the operated relay A releases and disconnects the earthed conductor 55 from the marking wire of this A link.

The input path 1 of the A switch 331 that is connected to the line circuit 5 has its marking wire connected to earh potential in the control equipment 17 via the conductors 104 and 106. Consequently the relays that have been operated in the switches 341 and 342 do not release as their series connected windings now are connected to this marking wire via the holding wire of the marked A link and the winding of a relay (not shown) in the A switch 331. This last mentioned relay operates thereby completing a connection from the line 98, through the positive and negative wires of the marked A, B and C links to the relay set 11, earthing the private wire of the line circuit 5 via this relay set, and completing a circuit between the holding wire of the line circuit 5 and the register 108 via the holding wire of the relay set 11 and the windings in series of the three relays that have been operated in the switches 331, 341 and 342. The holding wire of the line circuit 5 is connected to a negative potential D.C. supply so that these three relays do not release.

The earthing of the private wire in the line circuit 5 completes a circuit to hold operated the said cut-off relay in this circuit. Also it causes the current sensing nework 278 in the control equipment 17 (FIGURES 7 to 12) to discontinue the supply of an output signal to the conductor 280 and so permit the gate 335 to supply a negative potential signal to a delay network 344. After a delay of half a millisecond, which is to ensure that a relay actually has operated and held in each switching stage and that the contacts of these operated relays have settled, this negative signal from the gate 335 is applied to an amplifier 345 which causes earth potential to be applied to a conductor 346. This causes a relay PF to operate and the AND-gate 339 to be inhibited so that the relay MB releases.

When the relay MB releases, its contacts MB1 disconnect the positive supply 273 from the conductor 142 and current now flows from the register 108 through the said rectifier element in the relay set 11 and through the windings of the relays (not shown) which have been operated in the switches 331, 341 and 342 to the negative supply connected to the holding wire of the line circuit 5.

When the relay PF operates, its contacts PF1 connect the negative supply 240 to the conductor 133 and its contacts PF2 connect the negative supply 240 to a delay network 347.

Since the conductor **94*b* still is earthed by the operator relay (not shown) in the marking circuit 93, the connection of the negative supply 240 to the conductor 133 will cause the relays in the link selectors 14 and 15 that were operated and have released to reoperate. The marking wires of the previously marked A link and B link thus are reconnected to the conductors 55 and 137 respectively. Provided that the rectifier elements (not shown) in the switches 331 and 341 that are connected between these marking wires and the windings (not shown) of the relays have have been operated in these switches are not faulty, i.e. short circuited, no current flow will occur in the conductors 55 and 137. If current flow occurs in either of these conductors 55 and 137 a bistable circuit 348 is caused to switch after a delay of half a millisecond that is obtained by means of a delay network 349**.

If the bistable circuit 348 switches, an AND-gate 350 is inhibited, a signal is supplied to one of the fault recorders 323 and the relay FF is caused to operate with the results previously described.

11 milliseconds after the relay PF operates the delay network 347 provides an output signal which is passed by an AND-gate 351 to the gate 350. Unless the gate 350 has been inhibited in the manner previously described, a relay OK now operates. The operation of this relay OK indicates that the connection set up through the said switching stages cannot give rise to false markings of A links and B links during the setting up of subsequent connections. The operation of the relay OK initiates the restoration to normal of the control equipment 17. Thus the relay RA has its winding 327 energised via the contacts OK1, and the contacts OK2 connect the negative supply 240 to the conductor 116 to inititate the disconnection of the register 108 from the control equipment 17.

When the relay RA operates, its contacts RA1 cause the pulse generator 253 to supply a pulse to the conductor 132 and to each of the conductors 254. The contacts RA2 complete an alternative circuit for the winding 327 of this relay. The contacts RA3 complete a circuit between the positive and negative supplies 240 and 273 to cause the relay HA to release and the contacts RA4 have no function at this stage.

The pulse on the conductor 132 resets the bistable circuits in the link selectors 14, 15 and 16 such as the bistable circuit 196, and the pulse on the conductors 254 resets the bistable circuits 258 to 262 in the control equipment 17.

The relay HA releasing disconnects the conductors 92 from the delay network 294 at its contacts HA1 and causes the relay MK to release at its contacts HA2. The conductors 66, 141 and 146 are then disconnected from the negative supply 240 by the contacts MK1, MK2 and MK3 while the contacts MK4 prevent the relay MA reoperating.

The resetting of the bistable circuit 258 causes the relay RC to operate and the relay PW to release. The contacts RC1 connect earth potential to the delay network 282 to start the aforementioned 12 millisecond delay interval during which selection of the control equipment 17 by another register is inhibited. The contacts RC2 connect the negative supply 240 to each of the conductors 352 so as to reset those of the bistable circuits 267, 319, 328, 334 and 348 that have been switched from their normal state and to inhibit the gate 351 so that the relay OK releases. The contacts RC3 have no function at this stage. The resetting of the bistable circuit 334 causes the relay PF to release and the resetting of the bistable circuits 267 and 319 causes the relay OPK to release.

Upon the release of the relay PW, the operation of the relay T0 is prevented and the relays PY and OR are caused to release. The disconnection of earth potential from the conductors 111 and 112 by the contacts PY1 and of the negative supply 240 from the conductor 113 by the contacts PY2 initiates the release of the operated relay (not shown) in the marker 93. The relay OR releasing causes the relay OG to release followed by the release of the relays ISA and IS. When the relays PW and OK have both released, the relay RA releases.

All the relays release which have been operated in the link selectors 14, 15, and 16, the connector networks 48, 67 and 82 and the marking circuit 56 as the result of the release of the relays PF, MK, OG and ISA.

The operations described above from the selection of the register 108 to the release of the relay PW and the reoperation of the relay RC normally all take place within an interval of about 100 milliseconds. Consequently it is only in the event of a malfunction in the switching system that the relay T0 operates and causes the relay FF to operate. The relay MT0 and its associated delay network 286 are provided in case of failure of the relay T0, its associated delay network 290 or the bistable circuit 258.

With the completion of the connection from the line circuit 5 to the relay set 11 and the connection of this relay set to the register 108, "dialling tone" signal is supplied to the calling line 98. The calling subscriber served by this line 98 then commences dialling the directory number of the wanted subscriber and the dialled digits are supplied through the two said connections in series to the register 108 wherein they are stored. The initial digits designate the exchange serving the wanted subscriber and if the register 108 recognises this to be the present exchange it supplies signals to the register scanning circuit 120 such that when the in-circuit control equipment next becomes available this register 108 is selected in preference to all other registers. The register 108 also disconnects earth potential from the private wire and the holding wire of the output path 343 of the relay set 11 with the result that the connections which have been set up to this relay set from the line circuit 5 and to the register 108 from this relay set both release.

When the in-circuit control equipment, for example, the control equipment 17 becomes available and the register 108 is selected the resulting operations are similar to those described above except that the relays CHH and OE and not the relays OR and OG are operated and consequently only C links like the C links 6 which are connected to relay sets such as the relay set 9 and which are accessible from the B links 37 are examined to determine a route for a new connection through the switching system. The new connection is set up to one of these relay sets and this relay set is connected by one of the switches 122 to the register 108 all within the inter-digital pause following the last of the exchange designating digits dialled by the calling subscriber.

When the register 108 has received all the digits of the directory number of the wanted subscriber's line (not shown) a connection is set up to this line from the appropriate one of the relay sets such as the relay set 9. In fact this connection is set up by a further switching system (not shown) which is very similar to the switching system described above. The switching stage comprising the A switches is common to both of these switching systems as also are the group connector networks 48 to 51, 67 and 82 to 84, the link selectors 14, 15 and 16, the link marking circuit 56 and the marker 93. Also the control equipment 17 includes further circuitry (not shown) associated with this further switching system. Only one of these two switching systems at a time can be used for setting up a connection.

The said further switching system (not shown) has some of its output paths connected to the relay sets 9 and the like and the remainder of its output paths connected to relay sets (not shown) which are connected to incoming junction circuits (not shown) of the exchange.

In order to consider the circuit operations which result when a fault condition is encountered during the setting up of a connection between the line circuit of any calling subscriber and one of the relay sets 9, 10, 11 and the like, let it be assumed that the said second control equipment is in use at the relevant time. Due to the fault condition, the relays (not shown) operate in this control equipment which correspond to the relays FF and FAT and consequently the relay SAA operates in the control equipment 17 to initiate a second attempt at setting up the connection. The contacts SAA1 complete an alternative energising circuit for the winding 354 of the relay SAA. The contacts SAA2 connect a delay network 355 comprising a resistor 356, a capacitor 357 and a rectifier element 358, in series with the delay network 282. The reason for this will be described later. The contacts SAA3 complete an energising circuit for the winding 359 of the relay SAB. The contacts SAA4 complete a circuit for the supply of a negative voltage signal to the register scanner 120 via the gate 283 and the conductor 123.

Part (not shown) of the register scanner 120 associated with the control equipment 117 responds to this signal by selecting the particular register, for example, the register 108, which is selected at this time by the part (not shown) of this register scanner which is associated with the said second control equipment. It will be appreciated that this particular register 108 is the one which is involved in the connection being set up when the fault condition was encountered.

When the relay SAB operates, the contacts SAB1 inhibit operation of the relay FAT and thereby prevent a third attempt at setting up the connection should a fault condition be encountered during the second attempt. The contacts SAB2 prepare an energising circuit for the winding of a relay FR. The contacts SAB3 inhibit operation of the relay (not shown) which corresponds to the relay SAA in the unlikely event that the relay FAT is accidentally operated.

It is possible for a fault condition to be encountered during the setting up of a connection at a time after the said cut-off relay has operated in the calling subscriber's line circuit. It is necessary to ensure that this cut-off relay releases before commencing a second attempt to set up the connection and this requires a somewhat larger delay than is provided by the delay network 282. It is for this reason that the delay network 355 is connected in series with the delay network 282. The resulting delay is of the order of 60 milliseconds.

In the said second control equipment, the relay (not shown) corresponding to the relay RA is operated to initiate the restoration to normal of this control equipment. This is a direct consequence of the operation of the relay (not shown) corresponding to the relay FAT and immediately causes the operation of the relay (not shown) corresponding to the relay RC. Thus a negative voltage signal is applied to the conductor 231 and results in the operation of the relay C and the release of the corresponding relay (not shown). In this way, the control equipment 17 is connected into circuit in place of the said second control equipment. Consequently a signal is supplied to the conductor 114 by the now selected register 108 and the series connected delay networks 282 and 355 are energised via the contacts RC1.

After a delay of 60 milliseconds during which the previously attempted set-up is completely cleared down, the bistable circuit 258 switches and so starts the circuit operations for a second attempt to set up the required connection. Should this fail and the relay FF operate, the winding 360 of the relay FR is energised via the contacts PW6, FF1, SAB2 and ISA4. When this relay FR operates, the contacts FR1 complete a circuit to energise the winding 327 of the relay RA and so initiate the restoring of the control equipment 17 to normal. Further contacts FR2 cause the selected register 108 to release and a "number unobtainable" signal to be supplied to the calling subscriber's telephone instrument (not shown).

We claim:

1. An automatic switching system comprising a plurality of input paths, a plurality of output paths, selective switching means connected to these paths and operable selectively to provide connections between the input paths and the output paths, a plurality of common control circuits each to control and supervise the one-at-a-time setting up of such connections, selecting means connected to said control circuits that has a plurality of operating states in each of which it selects a different one of these control circuits for use in setting up said connections, fault indicating means connected to said control circuits to indicate occurrences of malfunctions during the setting up of connections, re-set means connected to said control circuits and to said fault indicating means to initiate a further attempt to set up a connection in response to a malfunction indication by said fault indicating means, and changeover means connected to said selecting means and to said fault indicating means to change the state of said selecting means in response to a malfunction indication whereby succeeding attempts to set up any connection each uses a different one of said control circuits.

2. An automatic switching system according to claim 1 further comprising counting means which is connected to said control circuits to record the number of times any selected control circuit is used for setting up connections and which also is connected to said selecting means to change the state of that selecting means each time this record attains a predetermined value.

3. An automatic switching system comprising a plurality of input paths, a plurality of output paths, selective switching means connected to these paths and operable selectively to provide connections between the input paths and the output paths, a plurality of common control circuits each to control and supervise the one-at-a-time setting up of such connections, selecting means connected to said control circuits that has a plurality of operating states in each of which it selects a different one of these control circuits for use in setting up said connections, counting means which is connected to said control circuits to record the number of times any selected control circuit is used for setting up connections and which also is connected to said selecting means to change the state of that selecting means each time this record attains a predetermined value, fault indicating means connected to said control circuits to indicate occurrences of malfunctions during the setting up of connections, re-set means connected to said control circuits and to said fault indicating means to initiate a further attempt to set up a connection in response to a malfunction indication by said fault indicating means, inhibiting means connected to and controlled by said re-set means to prevent more than a predetermined number of attempts being made to set up any particular connection, and changeover means connected to said selecting means and to said fault indicating means to change the state of said selecting means in response to a malfunction indication whereby succeeding attempts to set up any connection each uses a different one of said control circuits.

4. An automatic switching system comprising a plurality of input paths, a plurality of output paths, selective switching means connected to these paths and operable selectively to provide connections between the input paths and the output paths, two common control circuits each to control the one-at-a-time setting up of such connections, selecting means connected to said control circuits that has two operating states in each of which it selects a different one of these control circuits for use in setting up said connections, counting means which is connected to said control circuits to record the number of times the then selected control circuit is used for setting up connections and which also is connected to said selecting means to change the state of that selecting means each time this record attains a predetermined value, fault indicating means connected to said control circuits to indicate occurrences of predetermined malfunctions during the setting up of connections, re-set means connected to said control circuits and controlled by said fault indicating means to initiate a second attempt to set up a connection in response to a malfunction indication by said fault indicating means, inhibiting means controlled by said re-set means to prevent more than two attempts being made to set up any particular connection, and changeover means connected to said selecting means and to said fault indicating means to change the state of said selecting means in response to a fault indication whereby first and second attempts to set up any connection each uses a different one of said control circuits.

5. An automatic switching system according to claim 1 wherein a plurality of conductors are each connected to every control circuit for carrying electric control and supervisory signals to and from these control circuits, wherein each said control circuit includes a further plurality of conductors which correspond, one-to-one, to the first said plurality of conductors and a plurality of sets of normally open contacts each connected between a different one of said further plurality of conductors and the corresponding conductor of the first said plurality, and wherein said selecting means is connected to a plurality of contact switching devices which each controls the plurality of contact sets in a different one of said control circuits and which each is operated to close its plurality of contact sets in a different one of said operating states of said selecting means.

6. An automatic switching system according to claim 2 wherein said selecting means includes an electric circuit which is connected to and controlled by said counting means and said changeover means and which has a plurality of operating states that comprise the said operating states of said selecting means.

7. An automatic switching system according to claim 6 wherein there are two of said common control circuits and wherein said electric circuit comprises a bi-stable electric circuit which has two stable operating states and which selects said two control circuits alternately.

8. An automatic switching system according to claim 6 wherein said electric circuit has a plurality of input paths and is adapted to assume its operating states in sequence and one at a time in response to electric signals supplied to these input paths in a predetermined order, and wherein said counting means is connected to these input paths and is adapted to supply an electric signal to the next input path of said predetermined order each time said record attains the predetermined value.

9. An automatic switching system according to claim 8 wherein said changeover means comprises a plurality of signalling circuits each of which is connected to a different one of the input paths of said electric circuit and to said fault indicating means and which supply electric signals to these input paths in said predetermined order under the control of said fault indicating means.

10. An automatic switching system according to claim 3 wherein said fault indicating means comprises a plurality of fault detecting and indicating networks which are connected respectively to said plurality of control circuits to detect and indicate occurrences of predetermined malfunctions during the setting up of connections with the aid of their respective control circuits.

11. An automatic switching system according to claim 10 wherein each said fault detecting and indicating network comprises a plurality of electric fault detecting circuits each connected to the associated control circuit to detect occurrences of a different one of a plurality of predetermined malfunctions, and common indicating means connected to these fault detecting circuits to indicate the detection of a malfunction by any one of these fault detecting circuits.

12. An automatic switching system according to claim 11 wherein each of said fault detecting circuits includes an electric signal coincidence gate which has a plurality of inlets connected respectively to a plurality of points in the associated control circuit at which coincident electric signals occur only in the event of a predetermined malfunction during the setting up of a connection with the aid of that control circuit.

13. An automatic switching system according to claim 11 wherein each of said fault detecting and indicating networks further comprises timing means to time a predetermined time interval that is longer than any period of time for which the associated control circuit normally is used during the setting up of a connection, means to start and stop said timing means respectively at the beginning and end of the period for which that control circuit is used during the setting up of any connection, and means connected to said timing means and to the associated common indicating means to cause an indication from this indicating means if said timing means completes the timing of said predetermined time interval.

14. An automatic switching system according to claim 11 wherein each said common indicating means includes electric signal gating means which has a plurality of inlets connected to the associated plurality of fault detecting circuits respectively and an outlet and which supplies a malfunction indicating signal to its outlet upon the supply of a predetermined electric signal to any one of its inlets, and wherein each fault indicating circuit includes means to supply said predetermined signal to the associated gating means upon its detection of the allocated one of said predetermined malfunctions.

15. An automatic switching system according to claim 11 wherein each said common indicating means includes electric contact switching means which has a plurality of electric contact sets that it actuates when operated, and wherein each fault indicating circuit includes means to supply an operating signal to the associated contact switching means upon its detection of the allocated one of said predetermined malfunctions.

16. An automatic switching system according to claim 15 wherein said re-set means is controlled by said fault indicating means through contact sets of said contact switching means in said fault detecting and indicating networks.

17. An automatic switching system according to claim 16 wherein said changeover means is controlled by said fault indicating means through further contact sets of said contact switching means in said fault detecting and indicating networks.

18. An automatic switching system according to claim 16 wherein said re-set means includes a plurality of re-set devices each of which is adapted to operate upon its selection and initiates the use of a different one of said control circuits for a further attempt to set up a connection, and wherein a plurality of control paths are each connected between a different one of said control circuits and the re-set device of another one of those control circuits and each includes a contact set of that one of said contact switching means which is associated with the first said one of these two control circuits whereby the operation of the contact switching means associated with any one of said control circuits selects the re-set device associated with another one of said control circuits.

19. An automatic switching system according to claim 18 wherein said inhibiting means includes a plurality of inhibiting devices each of which is connected to a different one of said re-set devices and to a different one of said control paths and is adapted to inhibit operation of the re-set device connected to its control path upon the operation of the re-set device that is connected thereto, a different combination of two of said re-set devices being thus associated with each of said inhibiting devices.

20. An automatic switching system according to claim 19 wherein each of said inhibiting devices is connected to a different one of said contact switching means and is adapted to inhibit operation of the thus associated one of said contact switching means upon the operation of the re-set device to which it is connected, each inhibiting device being associated with the particular one of said contact switching devices of which a contact set is included in the control path connected to that inhibiting device.

21. An automatic switching system according to claim 1 wherein there is also provided fault evaluating means comprising a plurality of fault recording means each connected to said fault indicating means to record the malfunction indications for a different one of said common control circuits, record comparing means connected to said fault recording means to compare automatically the malfunction records for said control circuits and lock-out means connected to said record comparing means and to said selecting means to inhibit the selection by said selecting means of any control circuit which, from such comparison, is indicated to be faulty.

22. An automatic switching system according to claim 21 wherein said lock-out means includes a plurality of lock-out circuits each of which is connected to said selecting means to inhibit the selection of a different one of said control circuits.

23. An automatic switching system according to claim 1 wherein said switching means has a plurality of predetermined routes for connections between said input paths and said output paths and is adapted to connect automatically any input path to an output path when a route for the connection is marked, and wherein there are provided a network comprising a plurality of inlets that correspond, one-to-one, to input paths of said switching means, a plurality of outlets that correspond, one-to-one, to output paths of said switching means and a plurality of signalling paths which extend between said inlets and said outlets and which correspond, one-to-one, to the routes for connections between these input paths and these output paths, signalling means to supply an electric signal to the inlet corresponding to any one input path from which connection is required to one of said output paths, a plurality of control means which are included in said signalling paths to control the passage of said signal and which are connected to and controlled by said switching means according to the states, free and busy, of the corresponding routes and so that said signal only passes over signalling paths which correspond to free routes, path selecting means connected to said network to select one signalling path over which said signal reaches an outlet and route marking means connected to said switching means and to said network to mark for the connection the particular route that corresponds to the selected signalling path.

24. An automatic switching system comprising selective switching means which has a plurality of input paths, a plurality of output paths and a plurality of predetermined routes for connections between these input paths and these output paths and through which any input path is connected automatically to an output path when a route for the connection is marked, a network comprising a plurality of inlets that correspond, one-to-one to input paths of said switching means, a plurality of outlets that correspond, one-to-one, to output paths of said switching means and a plurality of signalling paths which extend between said inlets and said outlets and which correspond, one-to-one, to the routes for connections between these input paths and these output paths, signalling means to supply an electric signal to the inlet corresponding to any one input path from which connection is required to one of said output paths, a plurality of control means which are included in said signalling paths to control the passage of said signal and which are connected to and controlled by said switchting means according to the states, free and busy, of the corresponding routes and so that said signal only passes over signalling paths which correspond to free routes, path selecting means connected to said network to select one signalling path over which said signal reaches an outlet and route marking means connected to said switching means and to said network to mark for the connection the particular route that corresponds to the selected signalling path.

25. An automatic switching system according to claim 24 wherein said switching means comprises a switching assembly which includes means to connect each input path selectively to any one of some, but not all, of the output paths, and wherein said network has an individual inlet and an individual outlet for each input path and each output path respectively of that switching assembly.

26. An automatic switching system according to claim 24 wherein said switching means comprises a plurality of like switching assemblies which each has a plurality of input paths, a plurality of output paths and means to connect each of its input paths selectively to any one of some, but not all of its output paths, wherein said network has an individual inlet and an individual outlet for each input path and each output path respectively of any one of these switching assemblies and wherein there is means to allocate said network selectively to any one of said switching assemblies through which a connection is to be made.

27. An automatic switching system according to claim 26 wherein said means to allocate said network includes connecting means which is connected to said switching assemblies and to said control means and which is adapted to connect said control means selectively to any one of these switching assemblies through which a connection is to be made whereby said control means are controlled according to the states of the routes through this one switching assembly.

28. An automatic switching assembly according to claim 27 wherein said connecting means is connected to the output paths of said switching assemblies and is adapted to connect each output path of any one of said switching assemblies to a different one of said control means.

29. An automatic switching system according to claim 28 wherein said plurality of control means comprises a plurality of electric signal gates and wherein said network has a plurality of output circuits which each includes a different one of these gates and to which its plurality of outlets respectively are connected.

30. An automatic switching system according to claim 29 wherein said network includes a plurality of further electric signal gates which are each included in a different one of said signalling path and which are connected to and controlled by said path selecting means, wherein said path selecting means is adapted to effect the ordered opening of said further gates, upon its operation, until said signal appears at one of said outlets, and wherein there is provided start means to start operation of said path selecting means when said signal is supplied to any inlet.

31. An automatic switching system according to claim 30 wherein there are a plurality of groups of said further gates in said network, wherein the signalling paths that are connected to any one of said inlets each has its further gate in a different one of said groups and wherein said path selecting means opens said further gates one group at a time upon its operation.

32. An automatic switching system according to claim 30 wherein said path selecting means comprises pulse counting means to control the ordered opening of said further gates, a pulse supply path and gating means which is connected to said counting means, to said pulse supply path and to said start means and through which pulses supplied to said pulse supply path are passed to said counting means under the control of said start means.

33. An automatic switching system according to claim 24 wherein said switching means includes a series of switching assembles each of which has a plurality of input paths and a plurality of output paths, and a plurality of signalling links which each connects one output path of an associated one of said switching assemblies to one input path of the next switching assembly in said series, the input paths of the first switching assembly in said series and the output paths of the last switching assembly in said series respectively comprising input paths and output paths of said switching means.

34. An automatic switching system according to claim 33 wherein each switching assembly comprises means to connect each of its input paths selectively to any one of some, but not all of its output paths.

35. An automatic switching system according to claim 34 wherein said network comprises a plurality of sub-networks which are each associated with a different one of said switching assemblies and a plurality of linking paths which correspond, one-to-one, to said signalling links and which connect said sub-networks in a corresponding series to said switching assemblies, each said sub-network comprising a plurality of inlets that correspond, one-to-one, to the input paths of the associated switching assembly, a plurality of outlets that correspond, one-to-one, to the output paths of this switching assembly and a plurality of signalling circuits which extend between said inlets and said outlets and which correspond, one-to-one, to the connections which the associated switching assembly is able to provide between its input paths and its output paths.

36. An automatic switching system according to claim 35 wherein each sub-network has a plurality of output circuits which are included in its said signalling circuits and to which its plurality of outlets respectively are connected, and wherein said plurality of control means are each included in a different one of the output circuits of the sub-networks.

37. An automatic switching system according to claim 36 wherein each said control means comprises an electric signal gate and wherein each sub-network has a plurality of further electric signal gates which are each included in a different one of its said signalling circuits and which are connected to and controlled by said path selecting means.

38. An automatic switching system according to claim 37 wherein said path selecting means comprises a plurality of control circuits that each is connected to and controls said further gates of a different one of said sub-networks and sequencing means to co-ordinate said control circuits for the selection of one signalling path over which said signal reaches an outlet of the last sub-network in the series.

39. An automatic switching system according to claim 38 wherein each said control circuit comprises common control means to open all the associated further gates when enabled and cyclic control means to produce the ordered opening of the associated further gates when enabled and wherein said sequencing means comprises means to enable all said common control means when a connection is to be made through said switching means, means controlled from the outlets of said network to disenable and enable respectively the common control means and the cyclic control means of a different one of said control circuits at each of a predetermined number of appearances of said signal at any of these outlets and means controlled from the outlets of said network to disenable any previously enabled cyclic control means when said signal reaches any of these outlets whereby any one of the further gates controlled by this cyclic control means that was opened to permit said signal to reach any of these outlets is kept open.

40. An automatic switching system according to claim 39 wherein each sub-network has a plurality of groups of said further gates, wherein the signalling circuits of each sub-network that are connected to any one inlet of that sub-network each has its further gate in a different one of said groups and wherein each said cyclic control means opens the associated further gates, one group at a time when enabled as aforesaid.

41. An automatic switching system according to claim 40 wherein said switching means comprises a series of switching stages that each comprises a plurality of like switching assemblies each of which has a plurality of input paths, a plurality of output paths and means to connect each input path to any one of some, but not all of the output paths, and a plurality of signalling links which include the first said plurality of signalling links and which each connects one output path of an associated one of said switching stages to one input path of the next switching stage in said series, wherein said series of switching assemblies belong respectively to said series of switching stages and wherein a plurality of allotter means are connected respectively both to said plurality of switching stages and to said plurality of sub-networks each to allot the associated sub-network to any one of its associated switching assemblies through which a connection is to be made.

42. An automatic switching system according to claim 41 wherein each said allotter means includes connecting means which is connected to the output paths of the switching assemblies of the associated switching stage and to the control means in the sub-network associated with this switching stage and which is adapted to connect each of the output paths of any one of these switching assemblies to a different one of these control means whereby these control means are controlled according to the states, free and busy, of these output paths.

References Cited

UNITED STATES PATENTS

| | | | |
|---|---|---|---|
| 2,562,123 | 7/1951 | Powell | 179—18 |
| 3,328,534 | 6/1967 | Murphy et al. | 179—18 |

KATHLEEN H. CLAFFY, *Primary Examiner.*

A. H. GESS, *Assistant Examiner.*

U.S. Cl. X.R.

179—175.2